(12) United States Patent
Nakata et al.

(10) Patent No.: US 8,272,068 B2
(45) Date of Patent: Sep. 18, 2012

(54) SCANNING PROBE MICROSCOPE AND SAMPLE OBSERVING METHOD USING THE SAME

(75) Inventors: Toshihiko Nakata, Yokohama (JP); Masahiro Watanabe, Yokohama (JP); Takashi Inoue, Yokohama (JP); Kishio Hidaka, Hitachi (JP); Motoyuki Hirooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 12/523,369

(22) PCT Filed: Feb. 26, 2008

(86) PCT No.: PCT/JP2008/053268
§ 371 (c)(1),
(2), (4) Date: Nov. 13, 2009

(87) PCT Pub. No.: WO2008/111390
PCT Pub. Date: Sep. 18, 2008

(65) Prior Publication Data
US 2010/0064396 A1 Mar. 11, 2010

(30) Foreign Application Priority Data

Mar. 12, 2007 (JP) ................................. 2007-061201
Dec. 14, 2007 (JP) ................................. 2007-322722

(51) Int. Cl.
*G01N 13/00* (2006.01)
*G01B 11/30* (2006.01)
(52) U.S. Cl. ................ 850/58; 850/22; 850/24; 850/56; 850/59
(58) Field of Classification Search .................... 850/22, 850/24, 56, 58, 59
See application file for complete search history.

(56) References Cited

U.S. PATENT DOCUMENTS 6,246,054 B1 6/2001 Toda et al.
7,543,482 B2 6/2009 Kitazawa et al.

FOREIGN PATENT DOCUMENTS

JP 09-105865 4/1997
(Continued)

OTHER PUBLICATIONS

T. Pangaribuan, et al., "Reproducible Fabrication Technique of Nanometric Tip Diameter Fiber Probe for Photon Scanning Tunneling Microscope", *Japanese Journal of Applied Physics*, vol. 31, Pt. 2, No. 9A, 1992, pp. L 1302-L 1304.

(Continued)

*Primary Examiner* — David A Vanore
(74) *Attorney, Agent, or Firm* — Antonelli, Terry, Stout & Kraus, LLP.

(57) ABSTRACT

In a near-field scanning microscope using an aperture probe, the upper limit of the aperture formation is at most several ten nm in practice. In a near-field scanning microscope using a scatter probe, the resolution ability is limited to at most several ten nm because of the external illuminating light serving as background noise. Moreover, measurement reproducibility is seriously lowered by a damage or abrasion of a probe. Optical data and unevenness data of the surface of a sample can be measured at a nm-order resolution ability and a high reproducibility while damaging neither the probe nor the sample by fabricating a plasmon-enhanced near-field probe having a nm-order optical resolution ability by combining a nm-order cylindrical structure with nm-order microparticles and repeatedly moving the probe toward the sample and away therefrom at a low contact force at individual measurement points on the sample.

12 Claims, 30 Drawing Sheets

FOREIGN PATENT DOCUMENTS

| | | |
|---|---|---|
| JP | 09-297099 | 11/1997 |
| JP | 09-329605 | 12/1997 |
| JP | 10-325840 | 12/1998 |
| JP | 11-237391 | 8/1999 |
| JP | 2002-267590 | 9/2002 |
| JP | 2003-114184 | 4/2003 |
| JP | 2003-337099 | 11/2003 |
| JP | 2004-191277 | 7/2004 |
| JP | 2005-249588 | 9/2005 |
| JP | 2006-515682 | 6/2006 |
| WO | WO 2006/113192 | 10/2006 |

OTHER PUBLICATIONS

Y. Inouye, et al., "Near-field scanning optical microscope with a metallic probe tip", *Optics Letter*, vol. 19, No. 3, Feb. 1, 1994, pp. 159-161.

T. Okamoto, "Nano-plasmonics", *Spectroscopic Research*, vol. 54, No. 4, 2005, pp. 225-237.

FIG.14

| MATERIAL | $\lambda_1$ | $\lambda_2$ | $\lambda_3$ |
|---|---|---|---|
| Si | $I_{11}$ | $I_{21}$ | $I_{31}$ |
| $SiO_2$ | $I_{12}$ | $I_{22}$ | $I_{32}$ |
| $Si_3N_4$ | $I_{13}$ | $I_{23}$ | $I_{33}$ |
| Poly-Si | $I_{14}$ | $I_{24}$ | $I_{34}$ |
| W | $I_{15}$ | $I_{25}$ | $I_{35}$ |
| Aℓ | $I_{16}$ | $I_{26}$ | $I_{36}$ |
| Cu | $I_{17}$ | $I_{27}$ | $I_{37}$ |
| ... | ... | ... | ... |

441

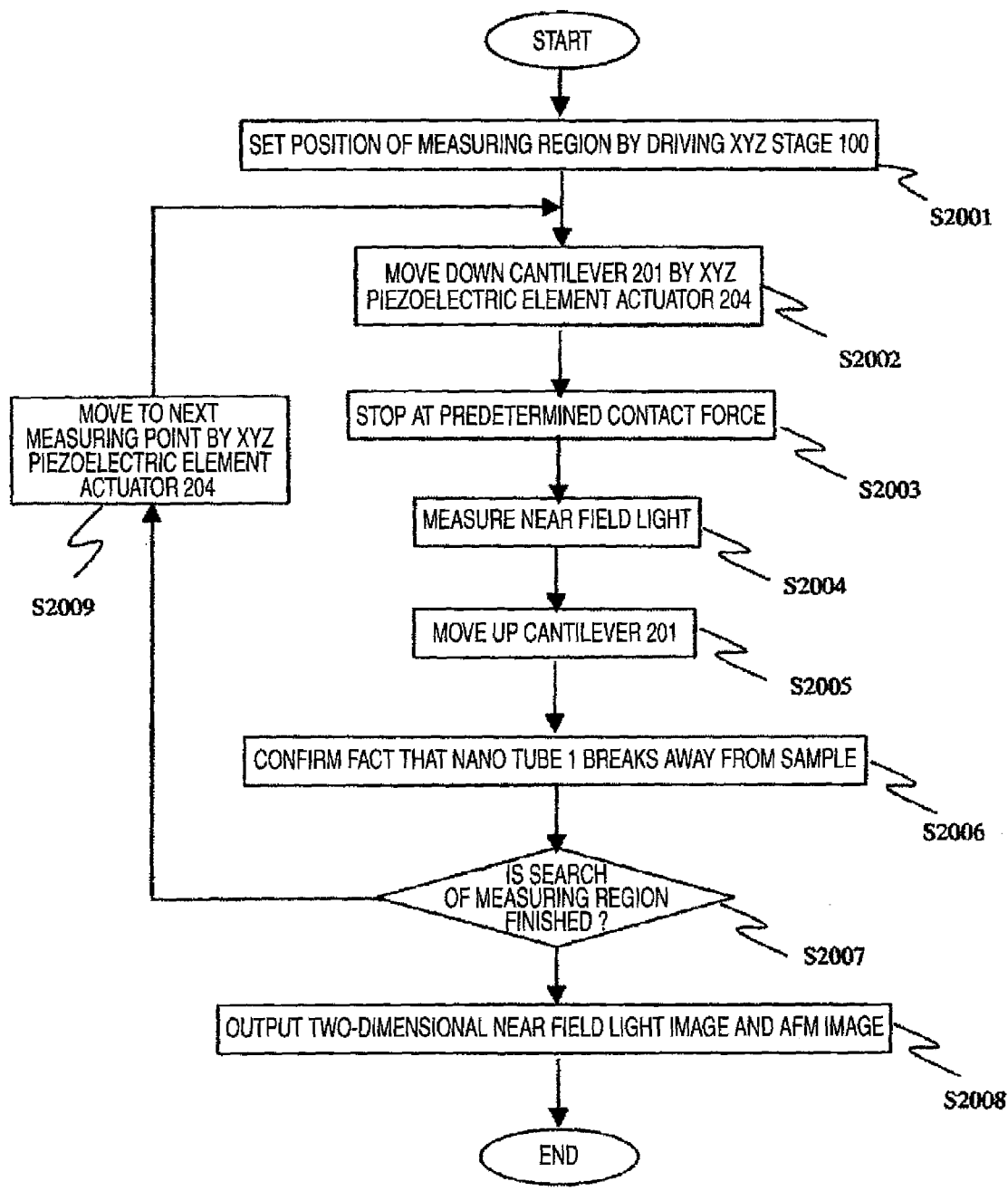

Au PARTICLE (s = 0)

NONE

Z = 0 nm

Z = 0.333 nm

SCANNING PROBE MICROSCOPE AND SAMPLE OBSERVING METHOD USING THE SAME

CROSS REFERENCE TO RELATED APPLICATIONS

The present application claims priority to Japanese Patent Application No. 2007-061201 filed on Mar. 12, 2007 and Japanese Patent Application No. 2007-322722 filed on Dec. 14, 2007, and the entire contents of which are incorporated herein by reference.

TECHNICAL FIELD

The present invention relates to a scanning probe microscope technique and a sample observing method using the same.

BACKGROUND ART

A scanning probe microscope (SPM) has been known as a measuring technique of a micro stereoscopic shape. In this technique, an atomic force microscope (AFM) is an observing technique of scanning a sample surface while keeping a contact force to a very small value by controlling an acuate probe, and has been widely used as a technique which can measure an atomic order micro stereoscopic shape. However, the atomic force microscope can not measure an optical property such as a reflectivity distribution and a refractive index distribution of a sample surface.

On the other hand, in an extra fine semiconductor device after 45 nm node, an application of a strain silicone is scheduled for speeding up, and it is absolutely necessary for managing a yield ratio to measure a stress distribution in a micro region. Further, in order to achieve a further refinement, it is demanded to carefully manage a distribution condition of an impurity atom by a nanometer order resolution. A physical property information such as a stress distribution, an impurity distribution and the like can not be measured by the atomic force microscope or a CD-SEM (a critical dimension SEM) used for managing a dimension. An optical method such as a Raman spectrometer measuring method and the like has been under review, however, a spatial resolution comes short in a general Raman spectroscopic micrometer.

Further, in order to specify a generation factor of a foreign particle and a defect detected by a foreign particle inspection and a defect inspection, a classifying work of the foreign particle and the defect is carried out by an electron microscope called as a review SEM, however, since it is a method depending only on a shape and a surface profile information, there is a limit in a classifying performance. In this case, it is possible to expect an improvement of the classifying performance by adding the optical information, however, the spatial resolution still comes short in the general optical microscope and laser scanning microscope.

As a means which solves these problems and measures the optical characteristics and the physical information of the sample surface at a high resolution, a scanning near-field optical microscope (SNOM) has been known. This microscope is structured such as to measure the optical characteristics such as the reflectivity distribution and the refractive index distribution of the sample surface at a resolution of some tens nm which is the same magnitude as an opening beyond a light diffraction limit, by scanning a near field light leaking from a micro aperture of some tens nm while keeping a gap between the aperture and the sample at the same some tens nm (an aperture probe), as disclosed in non-patent document 1. As a similar method, non-patent document 2 discloses a method of irradiating a light onto a metal probe from an external portion so as to scan the near field light having the magnitude of some tens nm which is scattered by a micro bottom of the probe (a scattering probe).

Further, non-patent document 3 describes a matter that a surface plasmon excited to a gold nano particle 2a by a micro spot light propagates one after another between the gold nano particles.

Further, patent document 1 discloses a method of forming a micro spot light by forming a micro spherical lens in a leading end of a fiber.

Patent Document 1: JP-A-2006-515682
Non-patent Document 1: Japanese Journal of Applied Physics, Vol. 31, pp. L1302-L1304 (1992)
Non-patent Document 2: Optics Letters, Vol. 19, pp. 159-161 (1994)
Non-patent Document 3: Spectroscopic Research, Vol. 54, Number 4, pp. 225-237 (2005)

DISCLOSURE OF THE INVENTION

Problem to be Solved by the Invention

However, in the near field scanning microscope mentioned above, a measuring resolution is some tens nm order, and the resolution comes short one digit or more in comparison with the atomic force microscope and the electron microscope having the nm order resolution. Further, it has a problem which is crucial for an industrial application, that is, a problem that a repeatability of measurement is extremely low. In other words, in the method using the aperture probe in the methods mentioned above, it is extremely hard to stably form the aperture, and some tens nm is assumed to be a limit practically. Further, the probe comes into collision with the sample at a time of scanning on the sample and the aperture is damaged and abraded, whereby the aperture expands little by little, and a repeatability of a measured image is lowered.

On the other hand, the scattering probe using the metal probe is assumed to have a higher resolution in comparison with the aperture probe, however, has such a problem that an exterior lighting light scatters in a root of the probe or on a sample surface so as to generate a background noise, or the probe comes into collision with the sample at a time of scanning on the sample and the bottom is damaged or abraded, whereby the measuring resolution is lowered and a sufficient repeatability can not be obtained, in the same manner as the aperture probe.

Further, in the method of forming the micro spherical lens in the bottom end of the fiber, the resolution is principally some tens nm order or higher. Further, the spherical lens comes into collision with the sample so as to be damaged or abraded at a time of scanning on the sample, the spot light becomes larger little by little, and its shape is deteriorated, whereby the repeatability of the measured image is lowered.

Accordingly, an object of the present invention is to provide a scanning probe microscope which does not damage both a probe and a sample, and can measure an optical information and a surface profile information of a sample surface at a nanometer order resolution and a high repeatability.

Further, the other object of the present invention is to achieve a high yield ratio production of a semiconductor device with a high reliability by measuring a physical information such as a stress distribution, an impurity distribution and the like of a semiconductor sample, and an optical information and a surface profile information contributing to a classification of a foreign particle and a defect at a nanometer order resolution, and feeding back to a manufacturing process condition.

Means for Solving the Problem

In order to achieve the object mentioned above, in accordance with the present invention, a scanning probe microscope is structured such as to be provided with a measuring probe in which an inner portion is hollow and a metal particle or a metal rod is embedded in the hollow inner portion, a cantilever supporting the measuring probe, a cantilever driving means driving the cantilever so as to relatively and three-dimensionally scan the measuring probe with respect to a sample to be inspected, a displacement detecting optical system means detecting a deformation of the cantilever, and a near field optical image acquiring means acquiring a near field optical image on a surface of the sample to be inspected by generating a near field light between the measuring probe in which the metal particle or the metal rod is embedded and the surface of the sample to be inspected.

Further, the present invention is structured such as to be provided with an atomic force microscope (AFM) image forming means forming an atomic force microscope image (AFM image) of the surface of the sample to be inspected by processing a signal obtained by detecting the deformation of the cantilever by means of the displacement detecting optical system means.

Further, in accordance with the present invention, there is provided an observing method of a sample by using a scanning probe microscope, comprising the steps of driving a cantilever supporting a measuring probe in which an inner portion is hollow and a metal particle or a metal rod is embedded in the hollow inner portion so as to relatively and three-dimensionally scan the measuring probe with respect to a sample to be inspected, optically detecting the deformation of the cantilever on the basis of the three-dimensional scanning, and acquiring a near field optical image of the surface of the sample to be inspected by using the measuring probe in which the metal particle or the metal rod is embedded.

Further, the present invention is structured such as to form an atomic force microscope image (AFM image) of the surface of the sample to be inspected by processing a signal obtained by optically detecting the deformation of the cantilever.

Effect of the Invention

In accordance with the present invention, it is possible to measure the optical information and the surface profile information of the sample surface at a nanometer order resolution and at a high repeatability without damaging both the probe and the sample. As a result, since it is possible to measure the physical information such as the stress distribution, the impurity distribution and the like of the semiconductor sample, and it is possible to measure the optical information and the surface profile information contributing to the classification of the foreign particle and the defect, a foreign particle and defect classifying performance is improved. Further, there can be obtained an effect that a semiconductor device can be produced at a high yield ratio with a high reliability by feeding back the result of measurement to the semiconductor manufacturing process condition.

The other objects, features and advantages of the invention will become apparent from the following description of the embodiments of the invention taken in conjunction with the accompanying drawings.

BEST MODE FOR CARRYING OUT THE INVENTION

There has been known a fact that a surface plasmon that free electrons within a metal collectively oscillate is generated by irradiating a light onto a micro metal particle, an evanescent light generated on the surface of the metal particle by the irradiated light is coupled with the surface plasmon so as to generate a plasmon resonance, and generate an electric field which is significantly enhanced locally, as well as generating a light absorption. Further, the locally significantly enhanced electric field acts on an adjacent metal micro particle, and makes the adjacent metal micro particle generate the plasmon resonance. The present invention forms the probe by utilizing the phenomenon that the plasmon resonance is transmitted between the metal micro particles, and observes or measures the optical state of the sample surface.

A description will be given of embodiments in accordance with the present invention with reference to the accompanying drawings.

Embodiment 1

A description will be given of a first embodiment in accordance with the present invention with reference to FIGS. 1, 2 and 8 to 11. In the present embodiment, as shown in FIG. 1, a plasmon enhanced near field probe is constructed by filling a spherical nano particle 2 of Au in an internal cavity portion of a multi-layer construction carbon nanotube (CNT) provided with a nature serving as a semiconductor or a boron nitride (BN) nanotube 1 exhibiting a nature serving as an insulating material. A filling method can make the inner portion of the nanotube 1 include the gold nano particle 2, for example, by putting the nanotube 1 in which both ends are opened by applying a high tension current or heating and the gold nano particle 2 within a vacuum chamber, carrying out a heating reaction and applying a capillary phenomenon. With regard to the application of the capillary phenomenon, for example, it is possible to apply such a technique as to be disclosed as (http://www1.accsnet.ne.jp/~kentaro/yuuki/nanotube/nanotube2.html) on a web.

In the present embodiment, an outer diameter of the nanotube is set to 20 nm, an inner diameter of the cavity portion is set to 4 nm, and a length is set within a range between some tens nm and some μm in correspondence to a shape of an object to be measured. A diameter of the gold nano particle 2 is 4 nm. In this case, since it is assumed that a critical diameter of the metal particle generating the plasmon is equal to or more than 1 nm, the object of the present invention can be achieved if the diameter of the gold nano particle is equal to or more than 1 nm. In the present embodiment, 4 nm is set as the critical diameter of the gold nano particle which can be comparatively stably manufactured. However, in the present invention, the diameter of the gold nano particle is not limited to 4 nm, but the object of the present invention can be achieved by a diameter in a range between about 1 nm and 20 nm. In this case, it is necessary to change the outer diameter of the nanotube in correspondence to the diameter of the gold nano particle. Further, a description will be given of a case that the gold is used as the metal particle in the following embodiment, however, the same effect can be obtained even by the other kind of metal.

The probe is molten and firmly fixed to insulating material holding portions 4a and 4b by using a tungsten (W) as a binder, for example, in accordance with an electron beam irradiation. Further, a laser light 5 having a wavelength 780 nm is irradiated from an upper side of a gold wedge 13 arranged close to a gold nano particle 2a which is exposed to an upper end portion of the nanotube. A micro spot light is induced on the basis of a plasmon resonance excited between a bottom 13a of the gold wedge 13 and the gold nano particle 2a. The non-patent document 3 described that the micro spot light excites a surface plasmon in the gold nano particle 2a which is exposed to the upper end portion of the nanotube, and the surface plasmon propagates one after another between the adjacent gold nano particles 2 within the nanotube 1 as shown by broken arrows 6a and 6b. As a result, the plasmon generated from the gold nano particle 2b in a lower end portion of the nanotube 1 generates a strong resonance phenomenon on the basis of a mutual action with the surface structure of the sample 10, and generates a micro near field light 7.

A spot diameter of the near field light 7 comes to 4 nm which is approximately the same magnitude as the gold nano particle 2b, at a time when the gold nano particle 2b comes closest to the sample 10. In other words, an optical resolution of 4 nm can be obtained by the present probe, and it is possible to identify, for example, regions 11 and 12 having different reflectivity of the sample 10, on the basis of the resolution. In an atomic force microscope, it is impossible to identify the regions 11 and 12. A reflected light of the near field light 7 is plasmon propagated to an upper side of the nanotube through the same path, the plasmon resonance is excited between the gold nano particle 2a exposed to the upper end portion of the nanotube and the bottom 13a of the gold wedge 13, and the generated micro spot light is scattered by the bottom 13a of the gold wedge 13 so as to be converted into a propagated light. The propagated light is detected by an objective lens 320 mentioned below.

It is desirable that the gold nano particles 2, 2a and 2b are provided with an interval s which is approximately equal to or less than the particle diameter d, as shown in FIG. 2A, while taking a plasmon propagation efficiency into consideration (refer to non-patent document 3). In the case that this is hard, there can be considered a method of securing an interval between the gold nano particles by coating the gold nano particle 2 by an insulating film 15 such as $SiO_2$ or the like, as shown in FIG. 2B.

FIG. 8 shows a structure of a scanning probe microscope in which the present probe is mounted. The scanning probe microscope is structured such as to be provided with a stage portion 1000 which can move in a three-dimensional direction XYZ while mounting a sample, a measuring portion 2000 measuring the sample by driving the nanotube 1, and generating an image by processing an obtained signal, a lighting optical system 3000 irradiating a light for generating a near field light between a leading end of the nanotube 1 and the sample, a detecting optical system 4000 detecting the near field light so as to focus and detect the propagated light, a sample monitor optical system 5000 for observing and positioning a portion to be measured on the sample, and a control portion 6000 controlling a whole.

The stage portion 1000 is provided with an XYZ stage 100 which can move in the three-dimensional direction XYZ while mounting the sample, and a driver 101. The sample 10 is mounted on the XYZ stage 100, and is driven by the driver 101 so as to be positioned at a desired measuring position while observing a surface of the sample 10 by the sample monitor optical system 5000 via the detecting optical system 4000.

The measuring portion 2000 is provided with a coupled optical system 200 and a cantilever 201 measuring the sample by using the nanotube 1, a piezoelectric element actuator 202, an XYZ piezoelectric element actuator 204, a semiconductor laser 206 irradiating a laser light (having a wavelength 405 nm) 208 onto a back face of the cantilever 201, a four-divided position sensor 209 detecting a reflected light from the cantilever 201, and a drive circuit 207 controlling the semiconductor laser.

The sample monitor optical system 5000 is provided with a mirror 5001 which can be taken in and out of an optical path of the detecting optical system 4000 by a drive means (not shown), and an imaging camera 5002 imaging an image of the light reflected by the mirror 5001 after transmitting through an image forming lens 330. In the case of driving the XYZ stage 100 mounting the sample 10 thereon by the driver 101 so as to set the desired measuring position of the sample 10 below the probe 1, the mirror 5001 is driven by a drive means (not shown) so as to be inserted to the optical path of the detecting optical system 4000 and bend the optical path of the reflected light from the sample to a direction of the imaging camera 5002, and an optical image of the surface of the sample is observed by the imaging camera 5002. If the desired measuring position of the sample 10 is positioned below the probe 1, the mirror 5001 is driven by a drive means (not shown) so as to be evacuated from the optical path of the detecting optical system 4000.

The nanotube 1 is fixed to the cantilever 201 together with the coupling optical system 200 constructed by the insulating material holding portions 4a and 4b and the gold wedge 13 shown in FIG. 1. The cantilever 201 is fixed to the piezoelectric element actuator 202 for finely oscillating in a direction Z, and is further fixed to the XYZ piezoelectric element actuator 204 finely scanning in directions XYZ. The light having the wavelength 780 nm and emitted from a semiconductor laser light source 300 is divided into two sections by a beam splitter 302 having a reflectivity=96:4, and a reflected light 303 is received by a photoelectric conversion element 304 such as a photodiode or the like so as to be converted into an electric signal. The signal is transmitted to a total control unit 420 in the control portion 6000, and is used for monitoring an intensity fluctuation of an emitted light from the semiconductor laser light source 300, and in the case that the intensity of the emitted light is changed, the intensity is made constant by controlling an output of the semiconductor laser light source 300.

The lighting optical system 3000 is structured such as to be provided with a laser light source 300, a beam monitor optical system 3100, a beam shaping optical system 305, a polarizing plate 307, a beam splitter 310, and an objective lens 320. In this structure, a light 301 emitted from the laser light source 300 and transmitting the beam splitter 302 of the beam monitor optical system 3100 is converted into a parallel light 306 having a circular beam shape by the beam shaping optical system 305, further transmits through the polarizing plate 307, and thereafter enters into the beam splitter 310 constructed by a half mirror, and about one half of the entering light is reflected by the beam splitter 310 so as to be focused as a convergent light 5 onto the coupling optical system 200 of the measuring portion 2000 by the objective lens 320.

In the measuring portion 2000, the surface plasmon excitation of the gold nano particle 2a is generated by the convergent light 5 entering into the gold wedge 13 as described above, and is propagated to the gold nano particle 2b in an opposite side (a leading end of the probe). The near field light 7 emitted from the gold nano particle 2b in a lower end portion of the nanotube 1 and reflected by the sample 10 is again plasmon propagated in a reverse direction along the sane path within the nanotube 1, and is scattered by the bottom 13a of the gold wedge 13 within the coupling optical system 200 so as to be converted into a propagation light. The polarizing plate 307 is formed as a radial shape (in a radial direction) in its polarizing shaft 308 as shown in FIG. 9, and improves an exciting efficiency of the plasmon by controlling a polarizing direction of the converged light 5 entering into the gold wedge 13 in such a manner as to be in parallel to a longitudinal direction of the gold wedge 13.

The detecting optical system 4000 detecting the propagation light is structured such as to be provided with an objective lens 320, a beam splitter 310 using a half mirror, an image forming lens 330 and a photoelectric conversion element 340.

In the detecting optical system 4000, the propagation light scattered by the bottom 13a of the gold wedge 13 within the coupling optical system 200 is focused by the objective lens 320 so as to be formed as the parallel light, is thereafter transmitted through the beam splitter 310 using the half mirror, and focused onto a light receiving surface of the photoelectric conversion element 340 such as the photodiode, a photo multiplier and the like by the image forming lens 330, thereby being photoelectrically converted.

In the image forming unit 410 of the measuring portion 2000, a two-dimensional near field light image is generated by processing the detection signal from the photoelectric conversion element 340 by using a control signal from the scanning control unit 400 generating a control signal of a driver 203 driving the piezoelectric element actuator 202 and a control signal of a driver 205 driving the XYZ piezoelectric element actuator 204, and an AFM image is generated by processing an output from the four-divided position sensor 209 by using the control signals of the drivers 203 and 205 driving the piezoelectric element actuator 202 and the XYZ piezoelectric element actuator 204.

The two-dimensional near field light image and the AFM image generated by the image forming unit 410 are transmitted to the total control unit 420 in the control portion 6000, and the images are displayed on respective independent screens of an output screen of an output unit 430 such as a display or the like, or are displayed on the same screen.

Next, a description will be given of a method of determining a contact force at a time when the nanotube 1 corresponding to a probe fixed to the bottom of the cantilever 201 comes into contact with the sample 10 by using an optical lever principle. A laser light (having a wavelength 405 nm) 208 from a semiconductor laser 206 driven by a drive circuit 207 is irradiated onto a back face of the cantilever 201, and a reflected light is received by the four-divided position sensor 209.

The driver 205 drives the XYZ piezoelectric element actuator 204 so as to move down the cantilever 201 and brings the nanotube 1 fixed to the bottom into contact with the sample 10. If the cantilever 201 is further moved down under this state, the inclination of the cantilever 201 is changed, the reflecting direction of the laser irradiated onto the back face of the cantilever 201 is changed, the incident position of the laser on the four-divided position sensor 209 is changed, and the output signal from the four-divided position sensor 209 is changed. The contact force can be determined by comparing the changed signal with the data of the contact force on the basis of the previously determined relation between the output signal from the four-divided position sensor 209 and the inclination of the cantilever 201.

Next, a description will be given of a procedure for measuring the surface of the sample with reference to FIG. 20. First of all, the step drives the XYZ stage 100 so as to position the measuring region of the sample 10 to the lower portion of the nanotube 1 attached to the bottom of the cantilever 201 (S2001). Next, as shown in FIG. 10, the step moves down the cantilever 201 by the XYZ piezoelectric element actuator 204 while monitoring the state (the contact force) between the nanotube 1 and the sample surface on the basis of the output signal from the four-divided position sensor 209, in the measuring region of the sample 10 (Z-direction scanning 501) (S2002), and the step stops the downward movement at a time point of coming to a predetermined set contact force (S2003).

After the step measures the near field light at a downward moving point 502 (S2004), the step moves up the cantilever 201 (Z-direction scanning 503) (S2005), the step determines whether or not the measurement of the measuring region is finished (S2607) if the nanotube 1 completely breaks away from the sample 10 on the basis of the output signal from the four-divided position sensor 209 (S2006), and the step drives the XYZ piezoelectric element actuator 204 so as to move the cantilever 201 to the next measuring point in the case that it is not finished (X scanning 504) (S2009). A moving amount (a feeding pitch) in the X scanning is decided in accordance with the resolution which is necessary in the observation. At the next measuring point, the step again moves down the cantilever 201 and measures the near field light (S2002 to S2006).

The above operations are called as a step-in operation. After the step repeatedly carries out the step-in operation over the two-dimensional measuring region (XY region) by the XYZ piezoelectric element actuator 204, the step finishes the measurement (S2007). In this case, the method of measuring the two-dimensional measuring region scans in the same manner as a raster scan in a television. The feeding pitch (an interval between the adjacent scans) in the Y-direction at this time is decided in correspondence to the resolution which is necessary in the observation.

The scanning control unit 400 of the measuring portion 2000 generally controls the XYZ direction scanning of the XYZ piezoelectric element actuator 204 driven by the driver 205, the oscillation control of the piezoelectric element actuator 202 driven by the driver 203 and the positioning of the XYZ stage 100, and the total control unit 420 in the control portion 6000 generally controls all the control of the contact force between the nanotube 1 and the sample, and the measurement of the near field light. Each of the XYZ scanning signal of the XYZ piezoelectric element actuator 204 from the scanning control unit 400, and the near field light measurement signal from the total control unit 420 is transmitted to the image forming unit 410, and the two-dimensional near field light image and the AFM image are generated, and are output to the output unit 430 such as the display or the like via the total control unit 420 (S2008).

A relation between the nanotube-sample contact force and the measuring timing of the near field light is shown in FIG. 11. As shown in a contact force change curve 510 in FIG. 11A, in accordance that the nanotube 1 moves up so as to evacuate from the sample 10, the contact force gives way to a retracting direction from a pushing direction, and the retracting force becomes maximum at a moment of breaking away from the sample. As long as it moves to the next measuring point and again comes close to the sample after breaking away, it comes to a state in which it is not exposed to the contact force at all. At a moment when the nanotube 1 restarts coming close and comes into contact with the sample 10, the force in the pushing direction is applied, and at a time point when the force reaches a set contact force, the cantilever 1 stops moving down.

On the other hand, as shown in a detection light intensity curve 520 in FIG. 11B, in accordance that the nanotube 1 moves up so as to evacuate from the sample 10, the near field light detection intensity is lowered little by little, and comes to a minimum value $I_F$ in a moment $T_F$ when the operation is changed from the retracting motion to the approaching motion after breaking away from the sample. Thereafter, the nanotube 1 restarts coming close, the near field light detecting intensity comes to a maximum value $I_C$ in a moment when the gold nano particle 2b comes into contact with the sample 10, and the intensity $I_C$ is maintained as long as the set contact force is maintained. A difference $\Delta I = I_C - I_F$ between the maximum value $I_C$ and the minimum value $I_F$ at an optional contact time $T_C$ is stored as a reflected light intensity at the measuring point in the total control unit 420. It is possible to measure the reflectivity distribution of the sample surface in the two-dimensional region by approximately the same optical resolution as the gold nano particle diameter 4 nm by repeatedly carrying out the operations mentioned above over the two-dimensional measuring region. It is desirable that the set contact force is executed at 1 nN or less, preferably at sub nN to pN.

In this case, in the present embodiment, only a descending motion and an ascending motion for achieving the set contact force are carried out without carrying out the micro oscillation in the direction Z of the cantilever 201. In this case, the detection of the contact force is not limited to the optical lever method, but it is possible to detect on the basis of an oscillation amplitude or a change of an oscillation frequency by finely oscillating the cantilever at a sub nano meter order amplitude and MHz order frequency by the piezoelectric element actuator 202.

As shown in FIGS. 1 and 11, in accordance with the present embodiment, not only it is possible to simultaneously acquire the AFM image and the near field light image, but also it is possible to always stably generate the near field light 7 having the spot diameter 4 nm between the gold nano particle 2b exposed to the lower end portion of the nanotube 1 and the sample 10. Further, it is possible to stably detect the near field light by detecting the near field light 7 in a moment when the nanotube 1 is brought into contact with the sample 10 by the low contact force, that is, the gold nano particle 2b comes into contact with the sample 10. As a result, the resolution of the two-dimensional near field light image is improved, and it is possible to dramatically improve the image repeatability.

FIG. 1B shows an example in which the shape of the lower end portion of the nanotube 8 is formed as a conical shape. For example, by applying a voltage to both ends of a multilayer structure carbon nanotube and enlarging an applied voltage, the current reaches a saturation region in due course. By enlarging the applied voltage further, the current is reduced step by step, the nanotube becomes narrower by being peeled off one by one from an outer layer, and is finally cut in the center of the nanotube. In accordance with this process, it is possible to sharpen the bottom of the nanotube. In other words, in the case that the lower end portion is formed as a cylindrical shape such as the nanotube 1 shown in FIG. 1A, it is hard to come closest to a surface profile structure which is finer than the cylinder diameter 20 nm, however, it is possible to come closest to the micro surface profile structure such as 4 nm by forming the lower end portion as the conical shape, such as the example shown in FIG. 1B, and it is possible to detect the two-dimensional near field light image of this order micro structure.

[Modified Embodiment of Plasmon Enhanced Near Field Probe]

A description will be given of a modified embodiment of the plasmon enhanced near field probe with reference to FIG. 3A. In the first embodiment, the structure is made such that the plasmon is propagated via the gold nano particle filled in the inner portion of the nanotube, however, in the present modified embodiment, the plasmon is propagated via a gold (Au) nano rod 9 having a diameter 4 nm, as shown in FIG. 3A. In other words, the gold (Au) nano rod 9 having the diameter 4 nm is filled in a cavity portion having an inner diameter 4 nm of the nanotube 1 having an outer diameter 20 nm. As the filling method, it is possible to make the gold nano particle 3 be included in the inner portion of the nanotube 1, for example, by throwing the nanotube 1 having open both ends and the gold nano particle 2 within the vacuum chamber on the basis of the high tension current application and the heating so as to be exposed to the heating reaction, thereby applying the capillary phenomenon. With regard to the application of the capillary phenomenon, for example, it is possible to apply such a technique as to be disclosed as (http://www1.accsnet.ne.jp/~kentaro/yuuki/nanotube/nanotube2.html) on a web.

The probe is fixed to the insulating material holding portions 4a and 4b, and the laser light 5 having the wavelength 780 nm is irradiated from the above of the gold wedge 13 which is moved close to the bottom 9a of the gold nano rod 9 exposed to the upper end portion of the nanotube. The micro spot light is induced on the basis of the plasmon resonance excited between the bottom 13a of the gold wedge 13 and the bottom 9a of the gold nano rod 9. The micro spot light further excites the surface plasmon in the bottom 9a of the gold nano rod 9 exposed to the upper end portion of the nanotube, and the surface plasmon propagates through the gold nano rod 9 within the nanotube 1, as shown by broken arrows 6a and 6b (refer to the non-patent document 3). As a result, the plasmon generated from the bottom 9b of the gold nano rod 9 which is exposed to the lower end portion of the nanotube 1 generates a strong resonance phenomenon on the basis of the mutual action with the surface structure of the sample 10, and generates the micro near field light 7. The spot diameter of the near field light 7 comes to the dimension 4 nm which is approximately the same as the bottom 9b of the gold nano rod 9, at a time when the nanotube 1 comes closest to the sample 10, that is, the bottom 9b of the gold nano rod 9 comes into contact with the sample 10.

In other words, the 4 nm optical resolution can be obtained by the present probe, and it is possible to identify, for example, the regions 11 and 12 of the different reflectivity of the sample 10 on the basis of the resolution. In accordance with the present embodiment, not only it is possible to simultaneously acquire the AFM image and the near field light image, but also it is possible to always stably generate the near field light 7 having the spot diameter 4 nm between the bottom 9b of the gold nano rod 9 which is exposed to the lower end portion of the nanotube 1 and the sample 10. Further, it is possible to stably detect the near field light by detecting the near field light 7 in a moment when the nanotube 1 is brought into contact with the sample by the low contact force, that is, the bottom 9b of the gold nano rod 9 comes into contact with the sample 10. As a result, the resolution of the two-dimensional near field light image is improved, and it is possible to dramatically improve the image repeatability.

FIG. 3B shows an embodiment in which the shape of the lower end portion of the nanotube 8 is formed as a conical shape. In other words, in the case that the lower end portion is formed as the cylindrical shape such as the nanotube 1 in the first modified embodiment shown in FIG. 3A, it is hard to come closest to the finer surface profile structure than the cylinder diameter 20 nm, however, it is possible to come closest to the micro surface profile structure such as 4 nm, by forming the lower end portion as the conical shape, such as the embodiment shown in FIG. 3B, and it is possible to detect the two-dimensional near field light image of this order micro structure.

[Modified Embodiment of Coupling Optical System 200]

A description will be given of a modified embodiment of the coupling optical system 200 with reference to FIG. 4. FIG. 4 shows a structure of a plasmon enhanced near field probe in the present embodiment. A structure of the nanotube and its function are the same as the embodiment shown in FIG. 1B. In the first embodiment and the first modified embodiment, the laser light 5 having the wavelength 780 nm is irradiated from the above of the gold wedge 13 which is moved close to the gold nano particle 2 or the bottom of the gold nano rod 9 which is exposed to the upper end portion of the nanotube 1 or 8, the micro spot light is induced on the basis of the plasmon resonance excited between the gold wedge 13 and the gold nano particle 2 or the bottom of the gold nano rod 9, and the surface plasmon is excited in the gold nano particle 2 or the bottom of the gold rod 9 by the micro spot light.

On the contrary, in the present embodiment, as shown in FIG. 4, a gold (Au) thin film is patterned triangularly on a lower face of a dielectric board 20 such as a quart or the like, one 21a of vertexes is moved close to the gold nano particle 2a which is exposed to the upper end portion of the nanotube 8, and a laser light 30 having a wavelength 780 nm is focused and irradiated from the above. A micro near field spot light 31 is induced on the basis of a plasmon resonance excited between the vortex 21a of the gold pattern 21 and the gold nano particle 2a, the micro spot light 31 further excites the surface plasmon in the gold nano particle, and the surface plasmon propagates from the gold nano particle 2 to the gold nano particle 2 within the nanotube 8 one after another, as shown by a broken arrow 6b.

As a result, the plasmon generated from the gold nano particle 2b in the lower end portion of the nanotube 1 generates the strong resonance phenomenon on the basis of the mutual action with the surface structure of the sample 10, and generates the micro near field light 7. The spot diameter of the near field light 7 comes to the dimension 4 nm which is approximately the same as the gold nano particle 2b. In other words, the 4 nm optical resolution is obtained by the present probe, and it is possible to identify, for example, the regions 11 and 12 of the different reflectivity of the sample 10, by the resolution.

In accordance with the present modified embodiment, not only it is possible to simultaneously acquire the AFM image and the near field light image, but also it is possible to always stably generate the near field light 7 having the spot diameter 4 nm between the gold nano particle 2b in the lower end portion of the nanotube 8 and the sample 10. Further, it is possible to stably detect the near field light by detecting the near field light 7 in a moment when the nanotube 8 is brought into contact with the sample by the low contact force, that is, the bottom 9b of the gold nano rod 9 comes into contact with the sample 10. As a result, the resolution of the two-dimensional near field light image is improved, and it is possible to dramatically improve the image repeatability.

[Modified Embodiment 1 of Detecting Optical System 4000]

A description will be given of a first modified embodiment of the detecting optical system 4000 with reference to FIG. 12. FIG. 12 shows a structure of a scanning probe microscope in the present embodiment. A basic structure of the present scanning probe microscope and its function are the same as the scanning probe microscope in the embodiment shown in FIG. 8, however, are different in a point that a spectroscope 611 is arranged in the detecting portion of the near field light. In other words, the near field light 7 emitted from the lower end portions of the nanotubes 1 and 8 and reflected by the sample 10 is again plasmon propagated along the same path, and is focused in an incident surface of the spectroscope 611 by an image forming lens 330 via a mirror 610.

In the spectroscope 611, a light having a desired wavelength is selected from the propagation light on the basis of the control signal from the total control unit 420, is focused on a light receiving surface of a photoelectric conversion element 612 such as a photodiode, a photo multiplier or the like, and is photoelectrically converted. The detection signal is transmitted to the total control unit 420, and a two-dimensional near field light image having a specific wavelength is formed. In the embodiment and the modified embodiment shown in FIG. 8, the same wavelength as the wavelength of the incident laser light is detected, however, in the present modified embodiment, it is possible to detect the near field light which is wavelength shifted from the incident laser light. For example, the stress distribution of the micro field of the semiconductor device using the strain silicone can be imaged by the nano meter resolution on the basis of the application of the Raman spectroscopy. In this case, it is desirable to set the contact force between the nanotube 8 and the sample 10 to the sub nN to pN order or less in such a manner as to prevent the Raman shift from being generated on the basis of generation of a micro deformation in the sample itself by the contact of the nanotube 8.

Further, it is possible to detect a two-dimensional near field light image of an optional wavelength within a wavelength band by using a light source such as an LED or the like having a broad wavelength band, in place of the semiconductor laser 300. Further, it is possible to obtain the two-dimensional near field spectroscopic image by changing the spectroscope 611 to an all wavelength general detecting type using an array sensor such as a CCD primary sensor or the like, and it is possible to carry out a spectroscopic analysis of the sample 10 by the nano meter resolution.

In the same manner as the embodiment shown in FIG. 8 and its modified embodiment, in accordance with the present embodiment, not only it is possible to simultaneously acquire the AFM image and the near field light image, but also it is possible to always stably generate the near field light 7, and it is possible to stably detect the near field light. As a result, the resolution of the two-dimensional near field light image is improved, and it is possible to dramatically improve the image repeatability.

[Modified Embodiment 2 of Detecting Optical System 4000]

A description will be given of a second modified embodiment of the detecting optical system 4000 with reference to FIG. 13A. In FIG. 13A, a white laser 620 generating three color lights in the vicinity of wavelengths 630 nm, 520 nm and 430 nm is used as the light source 620, and color separation filters 625r, 625g and 624b are arranged in the detecting portion of the near field light. As long as the near field light is generated between the nanotube 1 or 8 and the sample by the laser emitted from the light source 620 so as to transmit through the objective lens 320 and the beam splitter 310 via the probe 1 or 8 and reach the image forming lens 330, the structure is the same as the embodiment explained by using FIG. 8. The light reaching the objective lens 330 is focused by the image forming lens 330 via the mirror 610, and thereafter comes to a parallel light by a relay lens 615, and the light having the wavelength 630 nm is extracted by a dichroic mirror 621 (which transmits the wavelength 600 nm or more and reflects the wavelength 600 nm or less) and an interference filter 625r (having a transmission center wavelength 630 nm). The light is focused on a light receiving surface of a photoelectric conversion element 641 such as a photodiode, a photo multiplier and the like by a focusing lens 631, and is photoelectrically converted.

In the light reflected by the dichroic mirror 621, the light having the wavelength 520 nm is extracted by a dichroic mirror 622 (which reflects the wavelength 480 nm or more and transmits the wavelength 480 nm or less) and an interference filter 625g (having a transmission center wavelength 520 nm). The light is focused on a receiving surface of a photoelectric conversion element 642 such as a photodiode, a photo multiplier and the like by a focusing lens 632. The light transmitting through the dichroic mirror 622 is reflected by a mirror 623, and the light having the wavelength 430 nm is thereafter extracted by an interference filter 625b (having a transmission center wavelength 430 nm). The light is focused on a light receiving surface of a photoelectric conversion element 643 such as a photodiode, a photo multiplier and the like by a focusing lens 633, and is photoelectrically converted.

The detected signals of three wavelengths are transmitted to the total control unit 420, and the two-dimensional near field light images of three wavelengths are formed. Further, it is possible to generate a color image of a nano meter resolution by combining three wavelength signals. In accordance with the present embodiment, it is possible to execute a semiconductor defect review classifying the defect only on the basis of a monochrome image by the AFM image having the nano meter resolution and the color image, for example, while using the current scanning electron microscope (SEM), and a defect classifying precision is dramatically improved.

In accordance with the present embodiment, not only it is possible to simultaneously acquire the AFM image and the near field light image, but also it is possible to always stably generate the near field light 7, and it is possible to stably detect the near field light. As a result, the resolution of the two-dimensional near field light image is improved and it is possible to dramatically improve the image repeatability.

FIG. 13B shows a structure in which the structure shown in FIG. 13A is further provided with a memory unit 440 storing a semiconductor material-spectroscopic reflectivity data set shown in Table 441 in FIG. 14. In other words, as shown in FIG. 14, it is possible to execute a discrimination of a material constructing the sample 10 by the nano meter resolution, by previously storing combined data ($I_{11}, I_{21}, I_{31}$), ($I_{12}, I_{22}, I_{32}$), ($I_{13}, I_{23}, I_{33}$) ... between various materials such as Si, $SiO_2$ and the like used for manufacturing the semiconductor and reflected light intensities with respect to light source wavelengths $\lambda_1$=630 nm, $\lambda_2$=520 nm and $\lambda_3$=430 nm, and collating the detected light intensities of three obtained wavelengths with Table 441. Of course, the wavelength is not limited to three wavelengths, but a material analyzing precision is improved by increasing to four wavelengths and five wavelengths.

FIG. 15 shows an embodiment in which the scanning probe microscope in accordance with the present modified embodiment is applied to detection of a remaining film in a deep hole bottom such as a contact hole or the like. It is possible to obtain with or without the remaining film 502 and a material information by inserting the nanotube 1 or 8 to an inner portion of a contact hole 501 having a diameter about 30 nm, acquiring a spectroscopic signal in a moment when the nanotube comes into contact with the hole bottom by a low contact force, and collating the spectroscopic signal with a relation between a film thickness and a spectroscopic intensity which is previously stored in the memory unit 440. In accordance with the present embodiment, not only it is possible to simultaneously acquire the AFM image and the near field light image, but also it is possible to always stably generate the near field light 7, and it is possible to stably detect the near field light. As a result, the resolution of the two-dimensional near field light image is improved, and it is possible to dramatically improve the image repeatability.

Embodiment 2

A description will be given of a second embodiment in accordance with the present invention with reference to FIGS. 5A and 16. FIG. 5A shows a structure of a plasmon enhanced near field probe in accordance with the present embodiment. A material of the nanotube is a multilayer construction carbon nanotube 40 provided with a nature serving as a semiconductor, in the same manner as the first embodiment, or a boron nitride nanotube 40 exhibiting a nature serving as an insulating material. In the first embodiment and its modified embodiments, the nanotube in which both ends are opened is used, however, the present embodiment used the nanotube 40 in which both ends are closed, and a gold nano particle 2b is fixed to a lower end portion in accordance with a chemical modification or the like. If laser lights 50a and 50b having a wavelength 780 nm are irradiated in a state in which the nanotube 40 is moved down and the gold nano particle 2b is moved close to the sample 10, the gold nano particle 2b mutually acts with the surface structure of the sample 10 so as to generate a strong resonance phenomenon, and generates the micro near field light 7. The spot diameter of the near field light 7 comes to the magnitude 4 nm which is approximately the same as the gold nano particle 2b at a time when the gold nano particle 2b comes closest to the sample 10. In other words, the 4 nm optical resolution is obtained by the present probe, and it is possible to identify, for example, the regions 11 and 12 having the different reflectivity of the sample 10 by this resolution.

FIG. 16 shows a structure of a scanning probe microscope in which the present probe is mounted. The sample 10 is mounted on the XYZ stage 100, and is driven by a driver 101 so as to be positioned at a desired measuring position. the nanotube 40 is fixed to a cantilever 201. The cantilever 201 is fixed to a piezoelectric element actuator 202 for finely oscillating in the direction Z, and is further fixed to an XYZ piezoelectric element actuator 204 finely scanning in the XYZ directions. The light emitted from the semiconductor laser 300 having the wavelength 780 nm is divided into two sections by a beam splitter 302 having a transmission factor: reflectivity=96:4, and the reflected light 303 is received by a photoelectric conversion element 304 such as a photodiode or the like so as to be converted into an electric signal. This signal is transmitted to the total control unit 420, and is used for compensating an intensity fluctuation of the emitted light from the semiconductor laser 300.

The light 301 transmitting through the beam splitter 302 is converted into a parallel light 306 having a circular beam shape by a beam shaping optical system 305, further transmits a polarizing plate 307, is thereafter reflected by a ring-shaped reflection region 316a of the beam splitter 315, and focuses and irradiates the gold nano particle 2b in a lower end portion of the nanotube 40 as zonal light beams 50a and 50b by an objective lens 325 from an obliquely upper side. The near field light 7 mutually acting with the surface structure of the sample 10 is scattered by the gold nano particle 2b so as to be converted into a propagation light. The propagation light is focused by the objective lens 325, thereafter comes to a parallel light 317, transmits through a transmission region 316b of a beam splitter 315, is focused on a light receiving surface of a photoelectric conversion element 340 such as a photo diode, a photo multiplier and the like by an image forming lens 330, and is photoelectrically converted. The detection signal is transmitted to the total control unit 420. The polarizing plate 307 is formed as a radial shape (in a radial direction) in its polarizing shaft 308 as shown in FIG. 9, and improves an exciting efficiency of the plasmon by controlling a polarizing direction of the zonal lighting beams 50a and 50b so as to be in parallel to the longitudinal direction of the nanotube 40.

The laser light (having a wavelength 405 nm) from the semiconductor laser 206 driven by the drive circuit 207 is irradiated to a back face of the cantilever 201, and a reflected light is received by the four-divided position sensor 209. As shown in FIG. 10, the cantilever 201 is moved down by the XYZ piezoelectric element actuator 204 (Z-direction scanning 501) while monitoring the contact force between the nanotube 40 and the sample surface by the output signal from the four-divided position sensor 209, in the measuring region of the sample 10, and the downward movement is stopped at a time point when a predetermined set contact force is achieved. If the nanotube 1 completely breaks away from the sample 10 on the basis of the output signal from the four-divided position sensor 209, by moving up the cantilever 201 after measuring the near field light in a descending point 502, the cantilever 201 is moved to the next measuring point by the XYZ piezoelectric element actuator 204 (X-direction scanning 504).

At the next measuring point, the cantilever 201 is again moved down, and the near field light is measured. The measurement is finished after repeatedly carrying out the operations mentioned above over the two-dimensional measuring region (XY region) by the XYZ piezoelectric element actuator 204. The scanning control unit 400 generally controls the XYZ direction scanning of the XYZ piezoelectric element actuator 204 driven by the driver 205, the oscillation control of the piezoelectric element actuator 202 driven by the driver 203, and the positioning of the sample by the XYZ stage 100, and the control of the contact force between the nanotube 1 and the sample 10 and the measurement of the near field light are all generally controlled by the total control unit 420. The XYZ scanning signal of the XYZ piezoelectric element actuator 204 from the scanning control unit 400, and the near field measuring signal from the total control unit 420 are transmitted to the image forming unit 410, and the two-dimensional near field light image and the AFM image are generated, and are output to the output unit 430 such as the display or the like via the total control unit 420.

Since the relation between the nanotube-sample contact force and the near field light measuring timing is as shown in FIG. 11, and is absolutely the same as the first embodiment, a description thereof will be omitted. However, in the present embodiment, since the gold nano particle 2b is irradiated from the external portion of the nanotube 40 in place of being plasmon excited via the inner portion of the nanotube such as the embodiment which is explained by using FIG. 8, there is a risk that the lighting beam itself which is reflected and scattered by the surface of the sample 10 mixes as a stray light into the detection light. In this case, the piezoelectric element actuator 202 is driven by the driver 203, the cantilever 201 is finely oscillated in the direction Z at a fixed frequency f, and an intensity modification is applied to the near field light 7. It is possible to sensitively detect the information of the near field light 7 by extracting only a component of the frequency f from the detection signal of the photoelectric conversion element 340 by a lock-in amplifier 450 by using a drive signal having the fixed frequency f as a reference signal. The output signal from the lock-in amplifier 450 is transmitted to the total control unit 420. Thereafter process is in accordance with the process mentioned above.

FIG. 5B shows a structure in which a shape of the lower end portion of the nanotube 41 is formed as a conical shape. In other words, in the case that the lower end portion is formed approximately as a spherical shape such as the nanotube 40 shown in FIG. 5A, it is hard to come closest to the micro concavo-concave structure in comparison with the cylinder diameter 20 nm, however, it is possible to come closest to the micro concavo-concave structure such as about 4 nm by forming the lower end portion as the conical shape, as shown in FIG. 5B, and it is possible to detect the two-dimensional near field light image having this order micro structure.

In accordance with the present embodiment, not only it is possible to simultaneously acquire the AFM image and the near field light image, but also it is possible to always stably generate the near field light 7, and it is possible to stably detect the near field light. As a result, the resolution of the two-dimensional near field light image is improved, and it is possible to dramatically improve the image repeatability.

[Modified Embodiment of Plasmon Enhanced Near Field Probe]

A description will be given of a modified embodiment of the plasmon enhanced near field probe in accordance with the second embodiment of the present invention with reference to FIG. 6A. FIG. 6A shows a structure of a plasmon enhanced near field probe in the present embodiment. A material of the nanotube is a multilayer construction carbon nanotube 1 provided with a nature serving as the semiconductor in the same manner as the first embodiment, or a boron nitride nanotube 1 exhibiting a nature serving as an insulating material. Further, a structure of the scanning probe microscope mounting the probe and its function are the same as shown in FIG. 16.

The present nanotube 1 is structured in the same manner as the first embodiment such that both ends are opened, however, the gold nano particle 2b is filled only in the vicinity of the lower end portion, and a simplification of a probe manufacturing process is achieved. If the laser lights 50a and 50b having the wavelength 780 nm are irradiated in a state in which the nanotube 1 is moved down, and the gold nano particle 2b exposed to the lower end portion is moved close to the sample 10, the gold nano particle 2b mutually acts with the surface structure of the sample 10 so as to generate a strong resonance phenomenon, and generates the micro near field light 7. The spot diameter of the near field light 7 comes to 4 nm which is approximately the same magnitude as the gold nano particle 2b, at a time when the gold nano particle 2b comes closest to the sample 10. In other words, the 4 nm optical resolution is obtained by the present probe, and it is possible to identify, for example, the regions 11 and 12 having the different reflectivity of the sample 10 by the resolution. Since the method of detecting the image is the same as the method using the structure shown in FIG. 16 explained in the second embodiment, a description thereof will be omitted.

FIG. 6B shows a structure in which the shape of the lower end portion of the nanotube 8 is formed as a conical shape. In other words, in the case that the lower end portion is formed as the cylindrical shape such as the nanotube 1 shown in FIG. 6A, it is hard to come closest to the finer surface profile structure than the cylinder diameter 20 nm, however, it is possible to come closest to the micro surface profile structure such as about 4 nm by forming the lower end portion as the conical shape such as the present embodiment, and it is possible to detect the two-dimensional near field light image of this order micro structure.

In accordance with the present modified embodiment, not only it is possible to simultaneously acquire the AFM image and the near field light image, but also it is possible to always stably generate the near field light 7, and it is possible to stably detect the near field light. As a result, the resolution of the two-dimensional near field light image is improved, and it is possible to dramatically improve the image repeatability.

Embodiment 3

A description will be given of a third embodiment in accordance with the present invention with reference to FIGS. 7 and 17. FIG. 7 shows a structure of a plasmon enhanced near field probe in the present embodiment. A material of the nano tube is a multilayer construction carbon nanotube 8 provided with a nature serving as the semiconductor in the same manner as the embodiment shown in FIG. 31B, or a boron nitride nanotube 8 exhibiting a nature serving as an insulating material. Further, its structure is absolutely the same as the structure shown in FIG. 31B.

FIG. 17 shows a structure of a scanning probe microscope mounting the present probe therein. Since the other structures and functions than the optical system are the same as the scanning probe microscope in the first embodiment shown in FIG. 8, a description thereof will be omitted. The light emitted from a semiconductor laser 300 having a wavelength 780 nm is divided into two sections by a beam splitter 302 having a transmission factor:reflectivity=96:4, and a reflected light 303 is received by a photoelectric conversion element 304 such as a photodiode or the like so as to be converted into an electric signal. This signal is transmitted to the total control unit 420, and is used for compensating an intension fluctuation of the emitted light from the semiconductor laser 300.

The light 301 transmitting through the beam splitter 302 is converted into a parallel light 306 having a circular beam shape by a beam shaping optical system 305, further transmits through a polarizing plate 307, is thereafter reflected by a ring-shaped reflection region 316a of the beam splitter 315, and focuses and irradiates as the zonal lighting beams 50a and 50b, the gold nano particle 2b in the lower end portion of the nanotube 40 from an obliquely upper side, by the objective lens 325.

As shown in FIG. 7A, the near field light 7 mutually acting with the surface structure of the sample 10 excites the surface plasmon in the gold nano particle 2b, and the surface plasmon propagates from the gold nano particle 2 to the gold nano particle 2 within the nanotube 8 one after another, as shown by broken arrows 60a and 60b. As a result, the plasmon generated from the gold nano particle 2a in the upper end portion of the nanotube 8 mutually acts with the bottom 13a of the gold wedge 13 within the coupling optical system 200 so as to generate a strong resonance phenomenon, and generates the micro near field light. At the same time, the near field light is scattered by the bottom 13a of the gold wedge 13 so as to be converted into a propagation light 70. The propagation light 70 is focused by the objective lens 325, thereafter comes to an approximately parallel light, transmits through the transmission region 316b of the beam splitter 315, is focused on a light receiving surface of a photoelectric conversion element 340 such as a photodiode, a photo multiplier and the like by an image forming lens 330, and is photoelectrically converted. The detection signal is transmitted to the total control unit 420.

The polarizing plate 307 is structured, as shown in FIG. 9, such that the polarizing shaft 308 is formed as a radial shape (in a radial direction), and improves an exciting efficiency of the plasmon by controlling the polarizing direction of the zonal lighting beams 50a and 50b so as to be in parallel to the longitudinal direction of the nanotube 40. A pinhole plate 350 is installed just before the photoelectric conversion element 340, that is, at an image forming position of the bottom 13a of the gold wedge 13 within the coupling optical system 200, whereby only the propagation light scattered by the bottom 13a of the gold wedge 13 passes through a pinhole 351, and the stray light caused by the lighting beams 50a and 50b which are directly reflected and scattered by the surface of the sample having a deviated focal point is interrupted. Since the method of processing the detection signal and forming the image is the same as the first embodiment, a description thereof will be omitted.

In the same manner as the nanotube 8 in the second embodiment shown in FIG. 3, it is possible to come closest to the micro surface profile structure such as about 4 nm, by forming the lower end portion as the conical shape, and it is possible to detect the two-dimensional near field light image of this order micro structure. In accordance with the present embodiment, not only it is possible to simultaneously acquire the AFM image and the near field image, but also it is possible to always stably generate the near field light 7, and it is possible to stably detect the near field light. As a result, the resolution of the two-dimensional near field light image is improved, and it is possible to dramatically improve the image repeatability.

Modified Embodiment of Third Embodiment

A description will be given of a modified embodiment of the third embodiment with reference to FIGS. 7B and 18. FIG. 7B shows a structure of a plasmon reinforce near field probe in the present modified embodiment. A material of the nanotube is the multilayer construction carbon nanotube 8 provided with the nature serving as the semiconductor in the same manner as the first embodiment shown in FIG. 1B, or the boron nitride nanotube 8 exhibiting the nature serving as the insulating material. Further, since its structure is absolutely the same as the first embodiment shown in FIG. 1B, a description thereof will be omitted.

FIG. 18 shows a structure of a scanning probe microscope mounting the present probe therein. Since the other structures and functions than the optical system are the same as the scanning probe microscope in the first embodiment shown in FIG. 8, a description thereof will be omitted. The light emitted from the semiconductor laser 300 having the wavelength 780 nm is divided into two sections by the beam splitter 302 having the transmission factor:reflectivity=96:4, and the reflected light 303 is received by the photoelectric conversion element 304 such as the photodiode or the like so as to be converted into the electric signal. This signal is transmitted to the total control unit 420, and is used for compensating the intensity fluctuation of the emitted light from the semiconductor laser 300.

The light 301 transmitting through the beam splitter 302 is converted into the parallel light 306 having the circular beam shape by the beam shaping optical system 305, further transmits through the polarizing plate 307, is thereafter reflected by the ring-shaped reflection region 316a of the beam splitter 315, and irradiates as zonal lighting beams 80a and 80b the gold wedge 13 (within the coupling optical system 200) coming close to the gold nano particle 21 exposed to the upper end portion of the nanotube 8 from an approximately sideward by the objective lens 325.

The micro spot light is induced on the basis of the plasmon resonance excited between the bottom 13a of the gold wedge 13 and the gold nano particle 2a. The micro spot light excites the surface plasmon in the gold nano particle 2a which is exposed to the upper end portion of the nanotube 8, and the surface plasmon propagates from the gold nano particle 2 to the gold nano particle 2 within the nanotube 8 one after another, as shown by broken arrows 6a and 6b. As a result, the plasmon generated from the gold nano particle 2b in the lower end portion of the nanotube 8 mutually acts with the surface structure of the sample 10 so as to generate a strong resonance phenomenon, and generates the micro near field light 7. The spot diameter of the near field light 7 comes to 4 nm which is approximately the same dimension as the gold nano particle 2b, at a time when the gold nano particle 2b comes closest to the sample 10.

In other words, the 4 nm optical resolution is obtained by the present probe, and it is possible to identify, for example, the regions 11 and 12 having the different reflectivity of the sample 10, by this resolution. This near field light 7 is scattered by the surface structure of the sample 10 and the gold nano particle 2b in the lower end portion of the nanotube 8, and is converted into propagation lights 90a and 90b. The propagation lights 90a and 90b are focused by the objective lens 325, thereafter come to the approximately parallel lights, transmit through the transparent region 316b of the beam splitter 315, are focused on the receiving surface of the photoelectric conversion element 340 such as the photodiode, the photo multiplier and the like by the image forming lens 330, and are photoelectrically converted. The detection signal is transmitted to the total control unit 420.

The polarizing plate 307 is structured, as shown in FIG. 9, such that the polarizing shaft 308 is formed as the radial shape (in the radial direction), and improves the exciting efficiency of the plasmon by controlling the polarizing direction of the zonal lighting beams 80a and 80b entering into the gold wedge 13 so as to be in parallel to the longitudinal direction of the gold wedge 13. The pinhole plate 350 is installed just before the photoelectric conversion element 340, that is, at the image forming position of the gold nano particle 2b (approximately coinciding with the surface of the sample 10) in the lower end portion of the nanotube 8, only the 4 nm near field light information from the surface of the sample 10 passes through the pinhole 351, and the stray light such as the scattering light or the like from the bottom 13a of the gold wedge 13 or the gold nano particle 2a within the coupling optical system 200 having the deviated focusing point is interrupted. Since the method of processing the detection signal and forming the image is the same as the first embodiment, a description thereof will be omitted. In the present embodiment, the plasmon is excited by the gold wedge 13, however, it is possible to use the triangular gold pattern 21 shown in FIG. 4.

It is possible to come closest to the micro surface profile structure such as about 4 nm by forming the lower end portion as the conical shape, in the same manner as the nanotube 8 in the first embodiment shown in FIG. 1B, and it is possible to detect the two-dimensional near field light image having this order micro structure.

In accordance with the present embodiment, not only it is possible to simultaneously acquire the AFM image and the near field light image, but also it is possible to always stably generate the near field light 7, and it is possible to stably detect the near field light. As a result, the resolution of the two-dimensional near field light image is improved, and it is possible to dramatically improve the image repeatability.

Modified Embodiment in Second and Third Embodiment

A description will be given of a modified embodiment in the second and third embodiments with reference to FIG. 19. FIG. 19 shows a structure of a scanning probe microscope mounting a plasmon enhanced near field probe in accordance with the present embodiment therein. In the present embodiment, the structure of the plasmon enhanced near field probe is approximately the same as the structures shown in FIGS. 5A and 5B and FIGS. 6A and 6B, however, is different in a point that a fluorescent nano particle 660 is used as the nano particle 2b in the lower end portions of the nanotubes 1, 8, 40 and 41, as is different from the embodiments. For example, CdSe (core)/ZnS (outer shell) particle having a diameter 4 nm can be applied.

Since the other structures and functions than the optical system are the same as the scanning probe microscope in the first embodiment shown in FIG. 8, a description thereof will be omitted. The light emitted from an Hd—Cd laser 650 having a wavelength 325 nm is divided into two sections by the beam splitter 302 having the transmission factor:reflectivity=96:4, and the reflected light 303 is received by the photoelectric conversion element 304 such as the photodiode or the like so as to be converted into an electric signal. This signal is transmitted to the total control unit 420, and is used for compensating an intensity fluctuation of the emitted light from the Hd—Cd laser 650. The light 301 transmitting through the beam splitter 302 is converted into the parallel light 306 having the circular beam shape by the beam shaping optical system 305, further transmits through the polarizing plate 307, is thereafter reflected by the ring-shaped reflection region 316a of the beam splitter 315, and irradiates as the zonal lighting beams 50a and 50b the fluorescent nano particle 660 in the lower end portion of the nanotubes 1, 8, 40 and 41 from an approximately sideward by the objective lens 325.

The plasmon generated from the fluorescent nano particle 660 in the lower end portion of the nanotubes 1, 8, 40 and 41 mutually acts with the surface structure of the sample 10 so as to generate the strong resonance phenomenon, and generates the micro fluorescent near field light 7 near the wavelength 600 nm. The spot diameter of the fluorescent near field light 7 comes to approximately the same magnitude 4 nm as the fluorescent nano particle 660 at a time when the fluorescent nano particle 660 comes closest to the sample 10. In other words, the 4 nm optical resolution is obtained by the present probe, and it is possible to identify, for example, the regions 11 and 12 having the different reflectivity of the sample 10, by this resolution. The near field light 7 is scattered by the surface structure of the sample 10 and the fluorescent nano particle 660 in the lower end portion of the nanotubes 1, 8, 40 and 41, and is converted into a fluorescent propagation light 317 near the wavelength 600 nm. The propagation light 317 is focused by the objective lens 325, thereafter comes to an approximately parallel light, transmits through the transmission region 316b of the beam splitter 315, is focused on the light receiving surface of the photoelectric conversion element 340 such as the photodiode, the photo multiplier and the like by the image forming lens 330, and is photoelectrically converted. The detection signal is transmitted to the total control unit 420.

The polarizing plate 307 is structured, as shown in FIG. 14, such that the polarizing shaft 308 is formed as the radial shape (in the radial direction), and improves the exciting efficiency of the plasmon by controlling the polarizing direction of the zonal lighting beams 50a and 50b so as to be in parallel to the longitudinal direction of the nanotubes 1, 8, 40 and 41. An interference filter 355 having a transmission band of a wavelength 600 nm±10 nm is installed just before the photoelectric conversion element 340, and is structured such that only a fluorescent component near the wavelength 600 nm is extracted, and the scattered light by the sample surface by the zonal lighting beams 50a and 50b having the wavelength 325 nm and by the nanotube itself is interrupted.

In the present embodiment, it is possible to widely reduce a background noise caused by the scattering of the lighting beam itself, by extracting only the fluorescent near field light from the nano meter order fluorescent nano particle, and it is possible to detect the two-dimensional near field light image of the nano meter order micro structure. Further, in the same manner as the first to fourteenth embodiments, in accordance with the present embodiment, it is possible to simultaneously acquire the AFM image and the near field light image, it is possible to always stably generate the near field light 7, and it is possible to stably detect the near field light. As a result, the resolution of the two-dimensional near field light image is improved, and it is possible to dramatically improve the image repeatability.

In this case, in the first to third embodiments mentioned above, the gold nano particle or the gold nano rod is used as the nano particle or the nano rod, however, the present invention is not limited to this, for example, a nano particle or a nano rod of a silver, an aluminum or the like can be applied as long as an efficient particle or rod in the light of a plasmon exciting and a plasmon propagation. Further, the nanotube is not limited to the multilayer construction carbon nanotube and the boron nitride nanotube, but the other materials and structure can be employed as long as a material and a structure which are preferable for the plasmon exciting and the plasmon propagation in accordance with a combination with the nano particle or the nano rod, and have a nano meter order diameter cylindrical structure or are similar thereto.

Embodiment 4

A description will be given of a fourth embodiment in accordance with the present invention with reference to FIGS. 21 to 23. In the present embodiment, in the same manner as the first embodiment, as shown in FIG. 1B, a plasmon enhanced near field probe is constructed by filling a gold (Au) spherical nano particle 2 in an internal cavity portion of a multilayer construction carbon nanotube 1 (CNT) provided with a nature serving as a semiconductor and having a conical shape in a lower end portion of the nanotube 8, or a boron nitride (BN) nanotube 1 exhibiting a nature serving as an insulating material. Since the constructing method of the plasmon enhanced near field probe and its function are the same as the first embodiment, a description thereof will be omitted. Further, since a structure of the scanning probe microscope mounting the present probe and its function are the same as the first embodiment and absolutely the same as the structure shown in FIG. 8, and a procedure for measuring the surface of the sample is absolutely the same as that shown in FIGS. 11 and 20, a description thereof will be omitted.

FIG. 21A shows a two-dimensional intensity distribution (37a) of the near field light 7 in the lower end portion of the nanotube 8 and its cross sectional profile at a time of arranging an electric dipole (a point light source) having a polarizing shaft in a longitudinal direction of the probe having a wavelength 539 nm in an upper end portion of the plasmon enhanced near field probe shown in FIG. 1B, which are determined in accordance with a finite difference time domain method (FDTD method). The nanotube 8 is constructed as the multilayer construction carbon nanotube, and an interval s (refer to FIG. 2A) of the gold nano particles is set to 0. FIG. 21B shows a two-dimensional intensity distribution (37b) of the near field light 7 in the nanotube which is not filled with the gold nano particle and its cross sectional profile, for comparison. As shown in FIG. 21A, it is known that a light spot having the same diameter 4 nm as the gold nano particle is formed. In this case, observing the light spot in detail, it is known that an electric field is concentrated into an edge portion in the lower end of the carbon nanotube and a donut-like light generation distribution having a diameter 4 nm is generated, including the case that the gold nano particle is not filled as shown in FIG. 21B. Further, as is known from the state of the two-dimensional intensity distribution (37a) of the near field light 7 in FIG. 21A, a smaller donut-like light generation distribution is generated at a position corresponding to a center of the gold particle. There is a possibility that the distributions cause a noise at a time of detecting the image by two-dimensionally scanning the probe or cause an artifact.

On the other hand, FIG. 22 shows a two-dimensional intensity distribution 38a in the lower end portion of the nanotube 8 and its cross sectional profile (FIG. 22A), a two-dimensional intensity distribution 38b at a position which is 0.333 nm away from the lower end and its cross sectional profile (FIG. 22B), a two-dimensional intensity distribution 38c at a position which is 0.666 nm away from the lower end and its cross sectional profile (FIG. 22C), and a two-dimensional intensity distribution 38d at a position which is 1 nm away from the lower end and its cross sectional profile (FIG. 22D), which are determined in accordance with the FDTD method in the same manner. In accordance with being away from the lower end portion of the nanotube 8, it is known that the donut-like light generation distribution is smoothened, and the distribution is hardly recognized at the position which is 1 nm away therefrom in FIG. 22D. Accordingly, in the present embodiment, the measurement is carried out in a state in which the donut-like light generation distributions at the positions shown in FIG. 22 are averaged, by finely oscillating the cantilever 201 in the longitudinal direction (the direction Z) of the nanotube 8 shown by an arrow 36 in a range ±0.5 nm, as shown in FIG. 23, by the piezoelectric element actuator 202, in the scanning probe microscope (refer to FIG. 8) mounting the cantilever 201 to which the nanotube 8 is fixed. For example, in FIG. 11, a reflected light intensity measuring time at a time $T_C$ is set to 1 msec. As shown in FIG. 10, the reflected light is received by the photoelectric conversion element 340 of the detecting optical system 4000 (refer to FIG. 8) and is photoelectrically converted, in a state in which the cantilever 201 is finely oscillated at a frequency 1 MHz and an amplitude ±0.5 nm, while step-in operating the cantilever 201. The donut-like light generation distribution generated in the range 1 nm as shown in FIGS. 22A to 22D, that is, in the range ±0.5 nm is averaged by making the frequency band of the photoelectric conversion lower than the oscillation frequency, for example, about 10 kHz, and a stable light spot having a diameter 4 nm is obtained. The fine oscillation can be excited in accordance with a light and heat conversion by focusing the laser light intensity modulated by 1 MHz onto the back face of the cantilever 201. Further, the present embodiment can be combined with the first to third embodiments mentioned above.

In accordance with the present embodiment, in the same manner as the first embodiment, not only it is possible to simultaneously acquire the AFM image and the near field light image, but also it is possible to always stably generate the near field light 7 having the spot diameter 4 nm between the gold nano particle 2b which is exposed to the lower end portion of the nanotube 1 and the sample 10, and it is possible to stably detect the near field light by detecting the near field light 7 in a moment that the nanotube 8 is brought into contact with the sample 10 by the low contact force, that is, the gold nano particle 2b comes into contact with the sample 10. As a result, the resolution of the two-dimensional near field light image is improved, and it is possible to dramatically improve the image repeatability.

Embodiment 5

A description will be given of a fifth embodiment in accordance with the present invention with reference to FIG. 24. In the present embodiment, in the same manner as the first embodiment, a plasmon enhanced near field probe is constructed by filling a gold (Au) spherical nano particle 2 in an internal cavity portion of a multilayer construction carbon nanotube 1 (CNT) provided with a nature serving as a semiconductor and having a conical shape in a lower end portion of the nanotube 8, or a boron nitride (BN) nanotube 1 exhibiting a nature serving as an insulating material. Since the constructing method of the plasmon enhanced near field probe and its function are the same as the first embodiment, a description thereof will be omitted. Further, since a structure of the scanning probe microscope mounting the present probe and its function are the same as the first embodiment and absolutely the same as the structure shown in FIG. 8, and a procedure for measuring the surface of the sample is absolutely the same as that shown in FIGS. 11 and 20, a description thereof will be omitted. In the present embodiment, as shown in FIG. 24, it is possible to prevent an electric field concentration and obtain a stable light spot having a diameter 4 nm, by forming a bottom 8t of the nanotube 8 from an acute angle to a round shape, for example, in accordance with a focused ion beam (FIB) process or the like. The present embodiment can be combined with the first to fourth embodiments mentioned above.

In accordance with the present embodiment, in the same manner as the first embodiment, not only it is possible to simultaneously acquire the AFM image and the near field light image, but also it is possible to always stably generate the near field light 7 having the spot diameter 4 nm between the gold nano particle 2b which is exposed to the lower end portion of the nanotube 1 and the sample 10, and it is possible to stably detect the near field light by detecting the near field light 7 in a moment that the nanotube 1 is brought into contact with the sample 10 by the low contact force, that is, the gold nano particle 2b comes into contact with the sample 10. As a result, the resolution of the two-dimensional near field light image is improved, and it is possible to dramatically improve the image repeatability.

In this case, in the fourth to fifth embodiments mentioned above, the gold nano particle or the gold nano rod is used as the nano particle or the nano rod, however, the present invention is not limited to this, but it is possible to apply a nano particle or a nano rod, for example, of a silver, a platinum, an aluminum or the like as long as an efficient particle and rod, in the light of the plasmon exciting and the plasmon propagation. Further, the nanotube is not limited to the multilayer carbon nanotube and the boron nitride nanotube, but may employ the other materials and construction as long as preferable materials and constructions for the plasmon exciting and the plasmon propagation on the basis of the combination with the nano particle or the nano rod mentioned above, which have the cylindrical structure having the nano meter order diameter or are similar thereto.

Further, in the first to fifth embodiments mentioned above, the length of the nanotube is set in the range between some tens nm and μm in correspondence to the shape of the object to be measured, and the plasmon exciting wavelength is set to 780 nm, however, the present invention is not limited to this, but it is desirable to use efficient lengths and wavelengths (resonance wavelengths) in the case of assuming the nanotube as a resonator in the light of the plasmon exciting and the plasmon propagation.

It should be further understood by those skilled in the art that the foregoing description has been made on embodiments of the invention and that various changes and modifications may be made in the invention without departing from the spirit of the invention and the scope of the appended claims.

INDUSTRIAL APPLICABILITY

As described above, in accordance with the present invention, it is possible to achieve the scanning probe microscope having the nano meter order optical resolution together with the AFM. As a result, since it is possible to measure the physical information such as the stress distribution of the semiconductor sample, the impurity distribution and the like, and it is possible to measure the optical information and the surface profile information contributing to the classification of the foreign particle and the defect, the foreign particle and defect classifying performance is improved. Further, it is possible to reliably produce the semiconductor device with a high yield ratio by feeding back these results of measurement to the semiconductor manufacturing process condition.

BRIEF DESCRIPTION OF THE DRAWINGS

FIG. 14 is a schematic view showing a combined data of various material and a reflected light intensity with respect to each of light source wavelengths;

FIG. 15 is a cross sectional view of a cross section of a deep hole and a front face of a plasmon enhanced near field probe and shows an embodiment in which a scanning probe microscope in the modified embodiment 2 of the detecting optical system 4000 in accordance with the embodiment 1 is applied to a remaining film detection of a deep hole bottom such as a contact hole or the like;

FIG. 20 is a flow chart showing a procedure for measuring a sample surface in accordance with the embodiments 1 to 3;

Figure 1A:
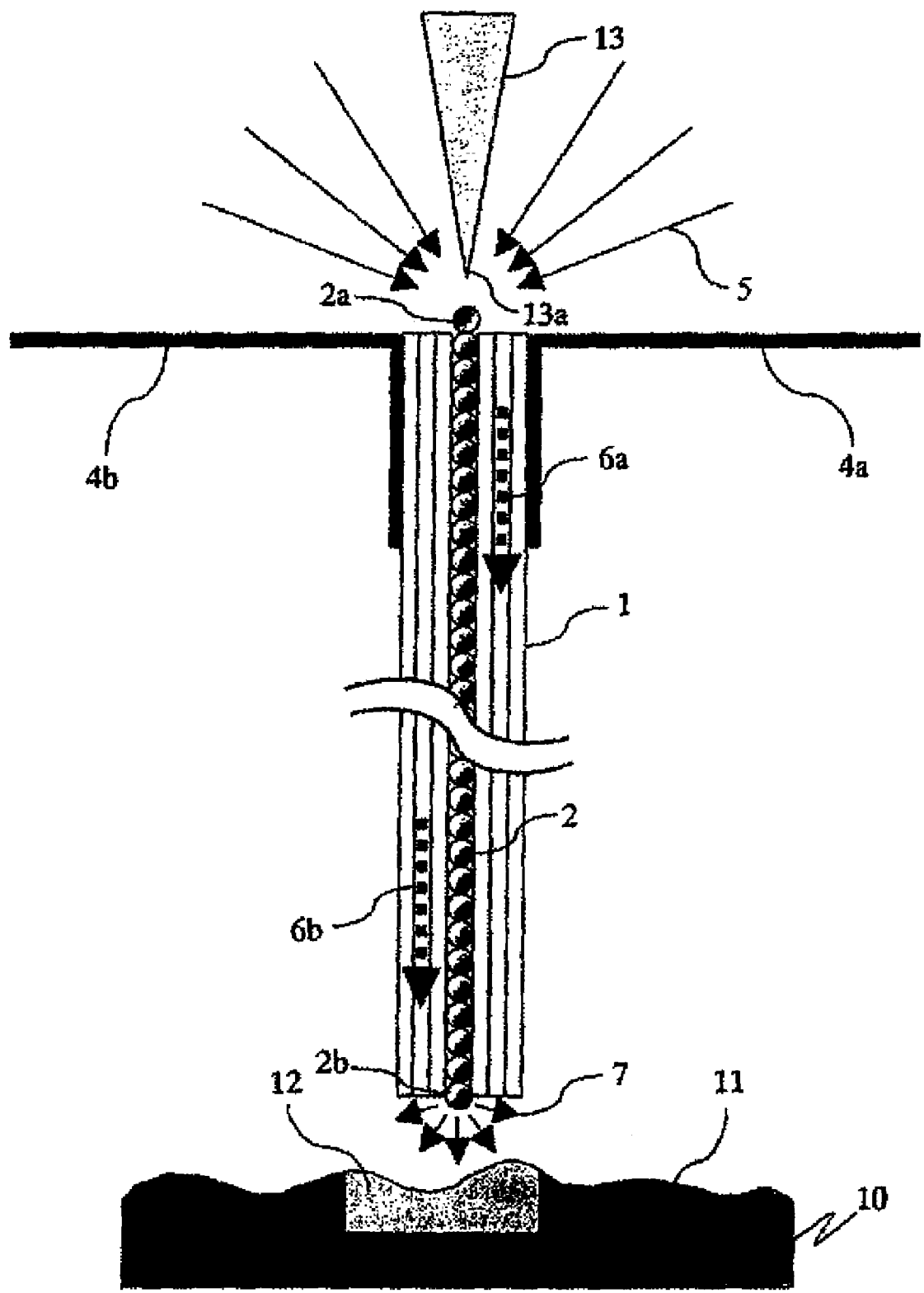
FIG. 1A is a cross sectional view of a front face of a plasmon enhanced near field probe in accordance with an embodiment 1.
Figure 1B:
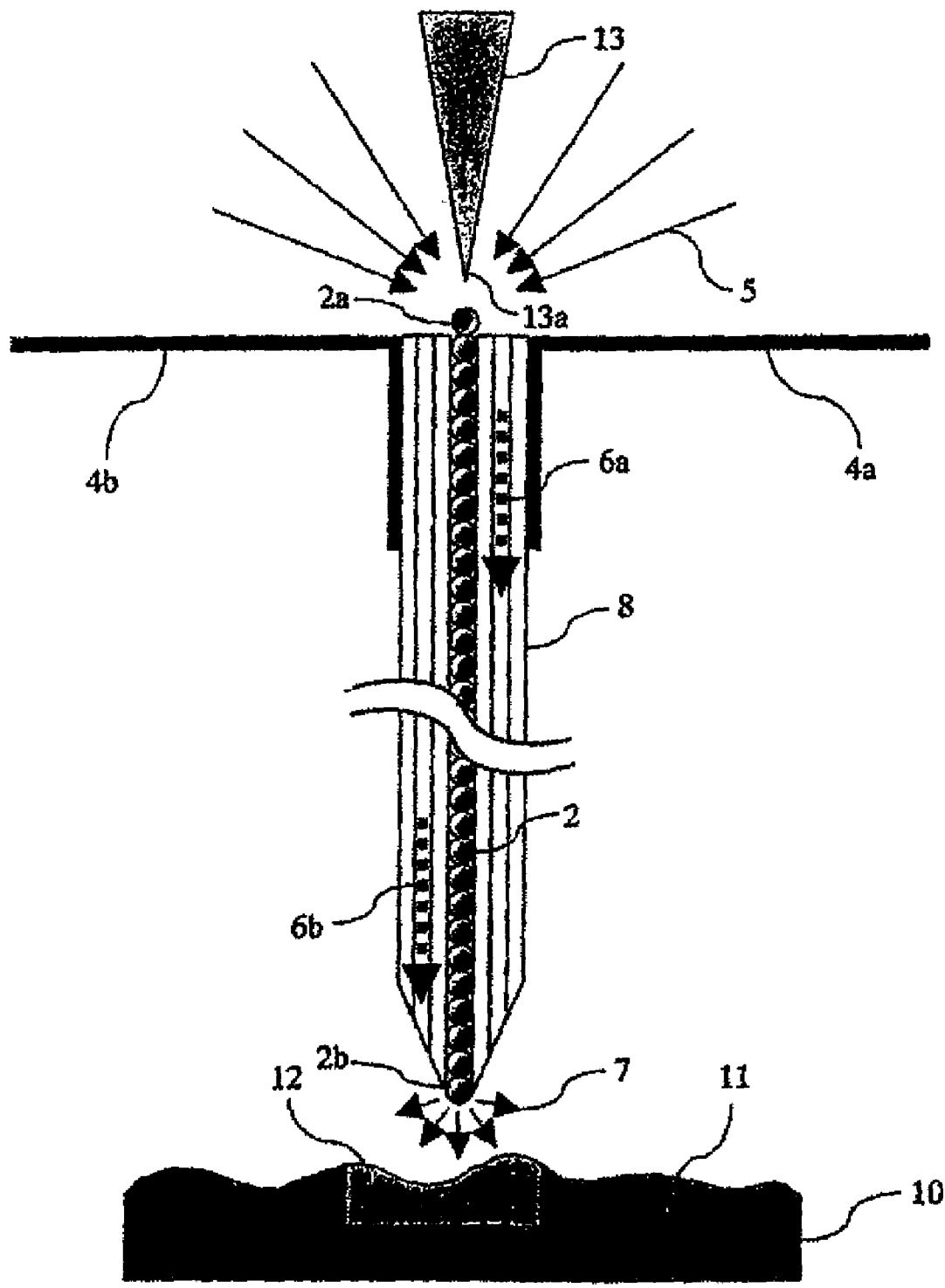
FIG. 1B is a cross sectional view of the front face of the plasmon enhanced near field probe in accordance with the embodiment 1.
Figure 2A:
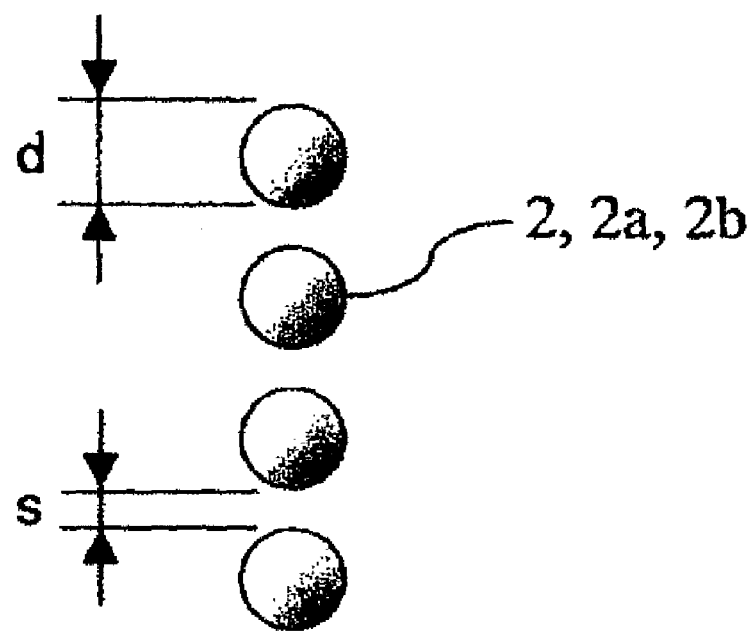
FIG. 2A is a schematic view showing a state of arrangement of gold nano particle in the plasmon enhanced near field probe.
Figure 2B:
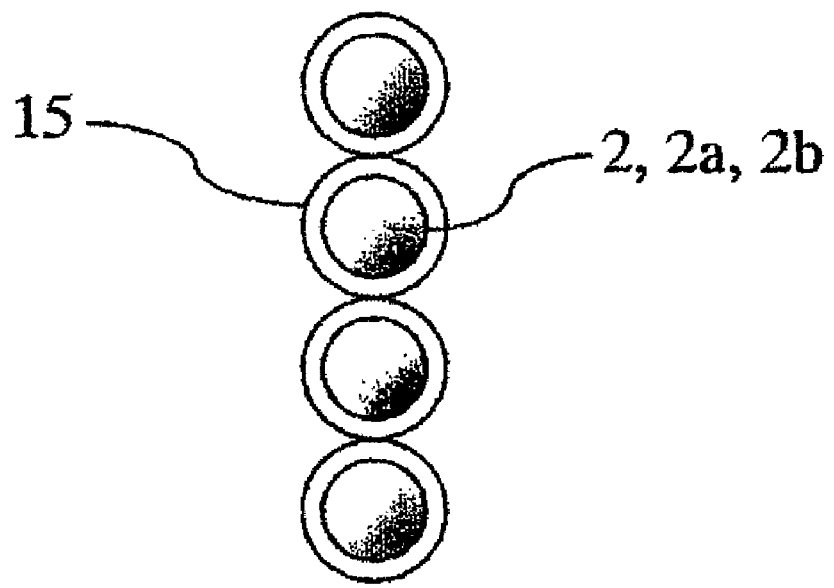
FIG. 2B is a schematic view showing the state of arrangement of gold nano particle in the plasmon enhanced near field probe.
Figure 3A:
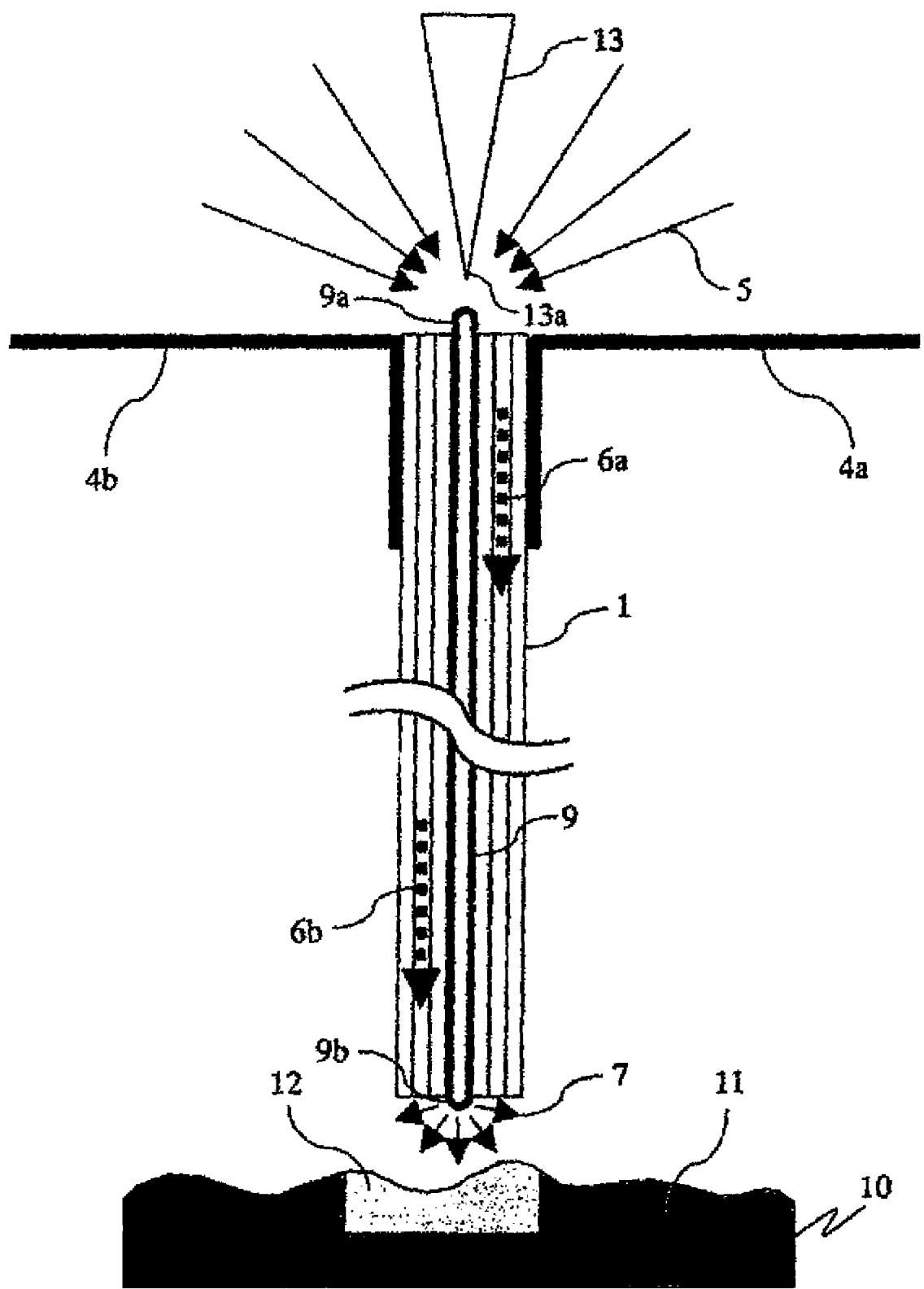
FIG. 3A is a cross sectional view of a front face of a probe in a modified embodiment of the plasmon enhanced near field probe in accordance with the embodiment 1.
Figure 3B:
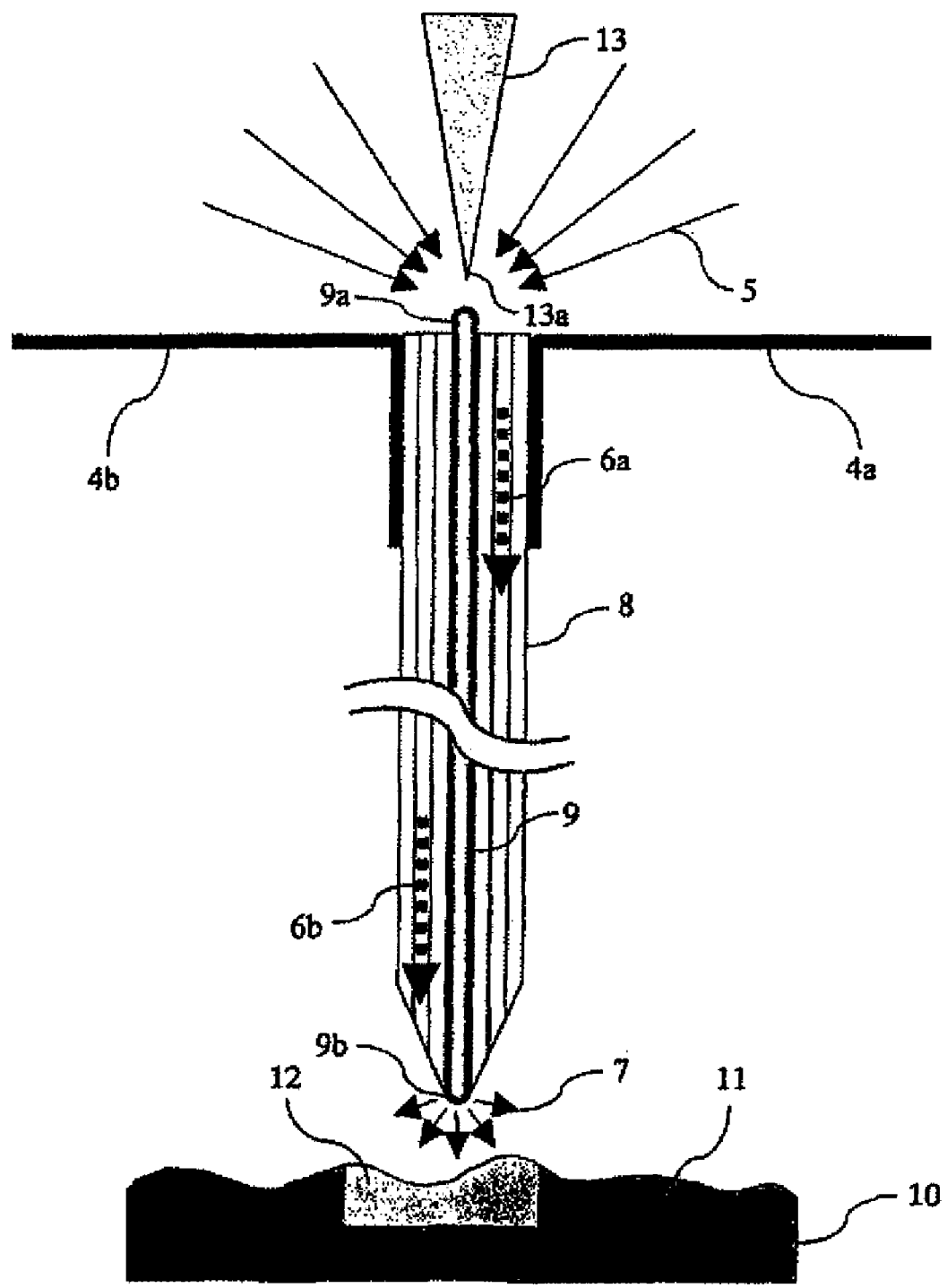
FIG. 3B is a cross sectional view of the front face of the probe in the modified embodiment of the plasmon enhanced near field probe in accordance with the embodiment 1.
Figure 4:
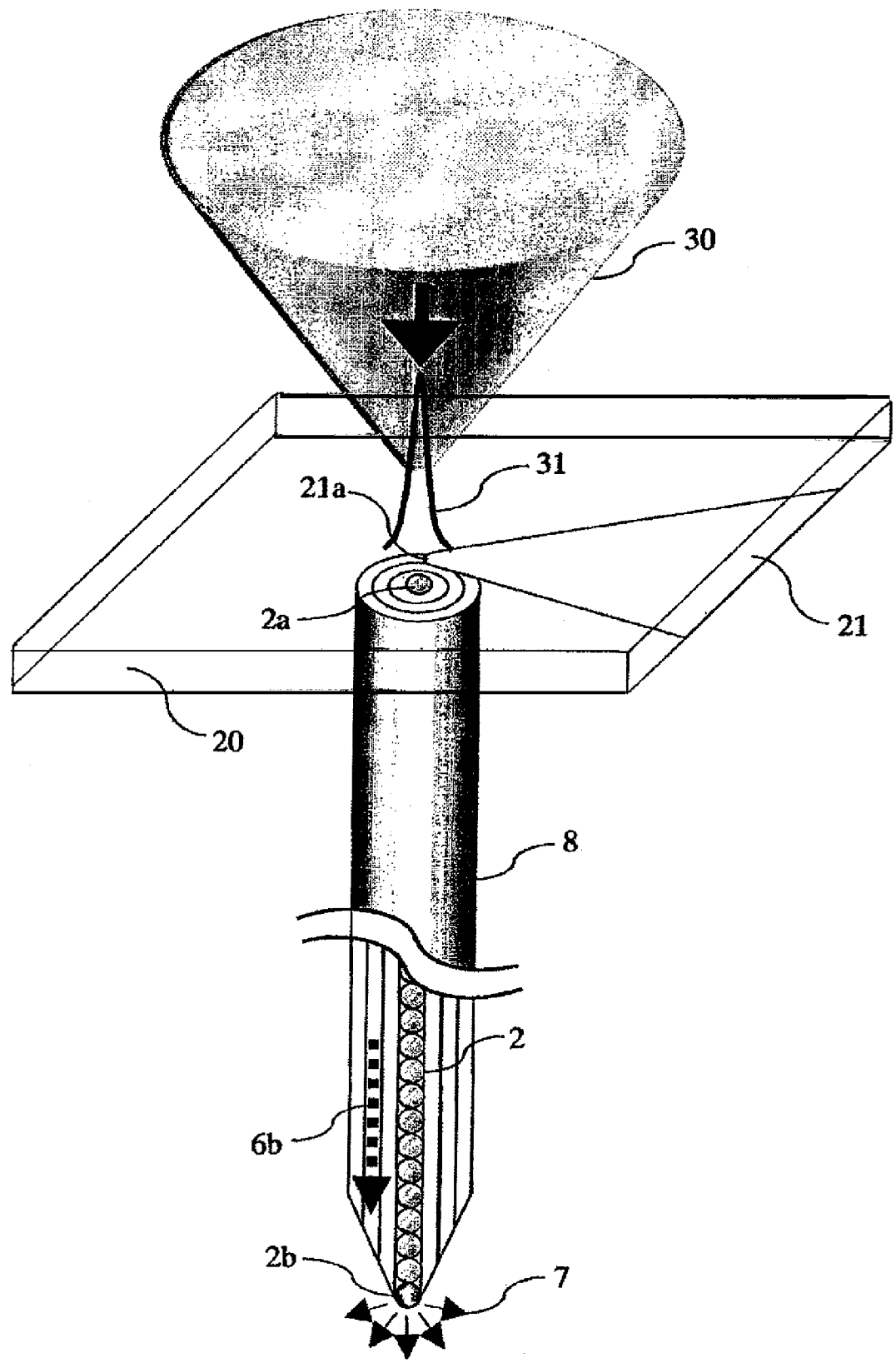
FIG. 4 is a cross sectional view showing a plasmon enhanced near field probe and a plasmon exciting in a modified embodiment of a coupling optical system 200 in the embodiment 1.
Figure 5A:
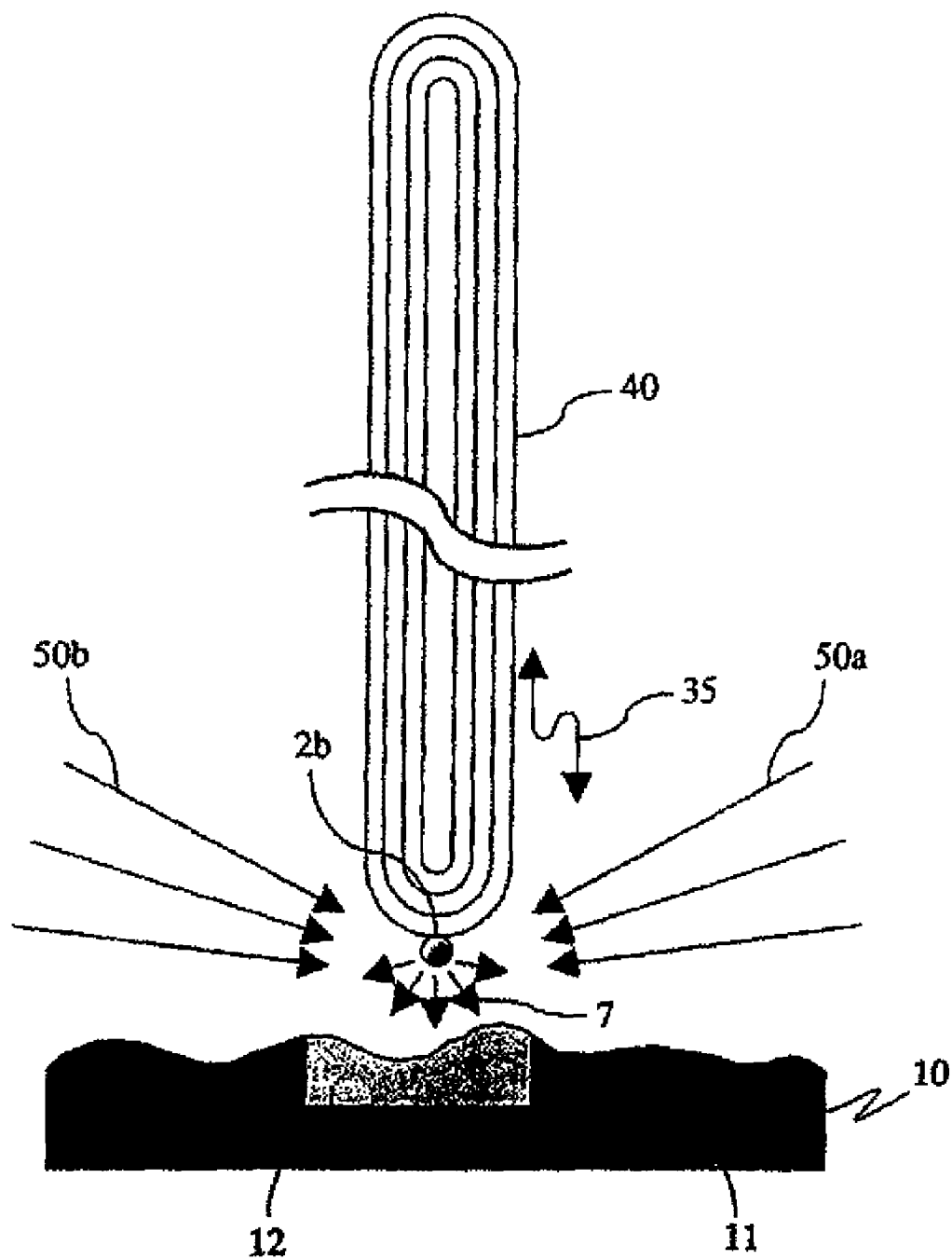
FIG. 5A is a cross sectional view of a front face of a plasmon enhanced near field probe in accordance with an embodiment 2.
Figure 5B:
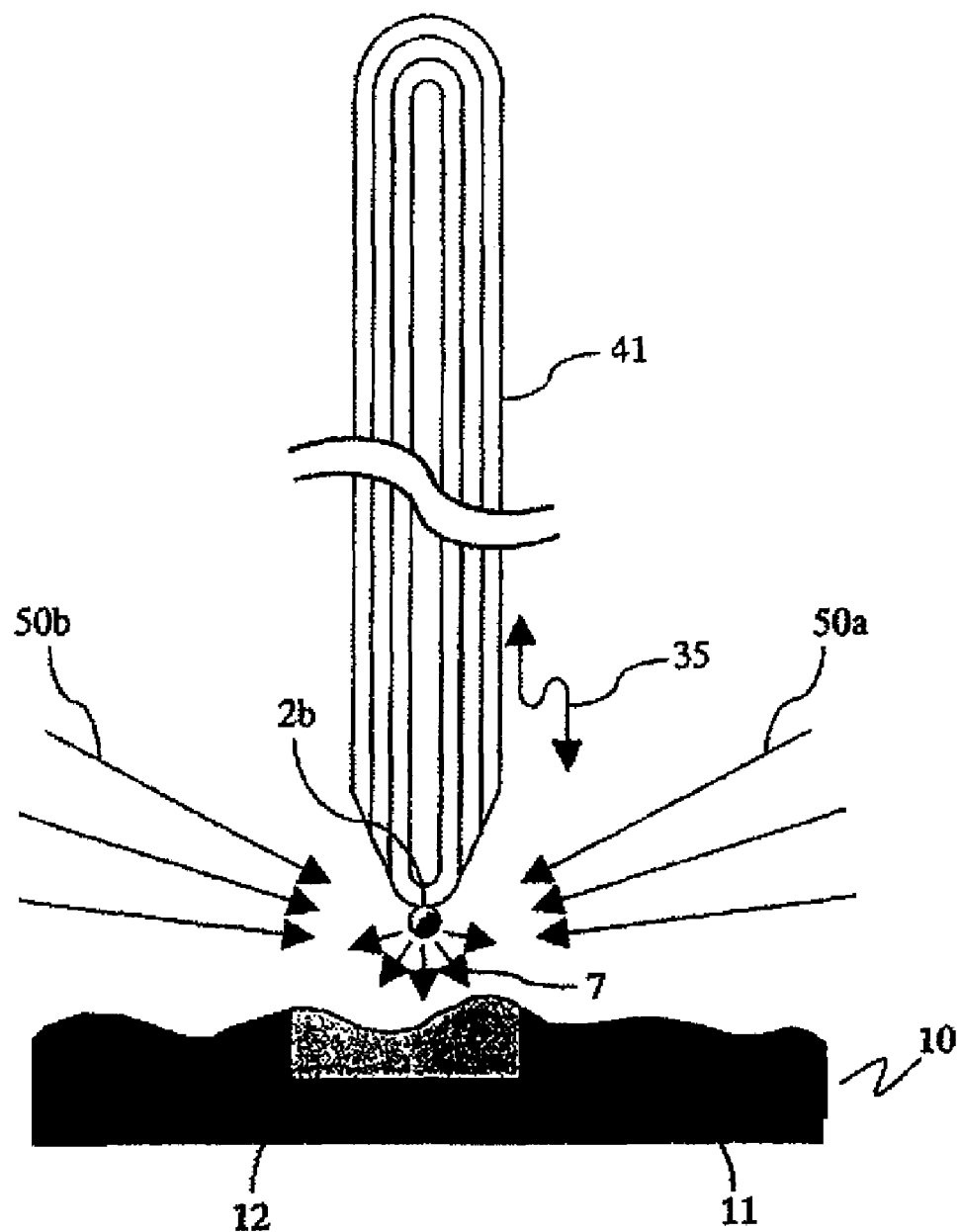
FIG. 5B is a cross sectional view of the front face of the plasmon enhanced near field probe in accordance with the embodiment 2.
Figure 6A:
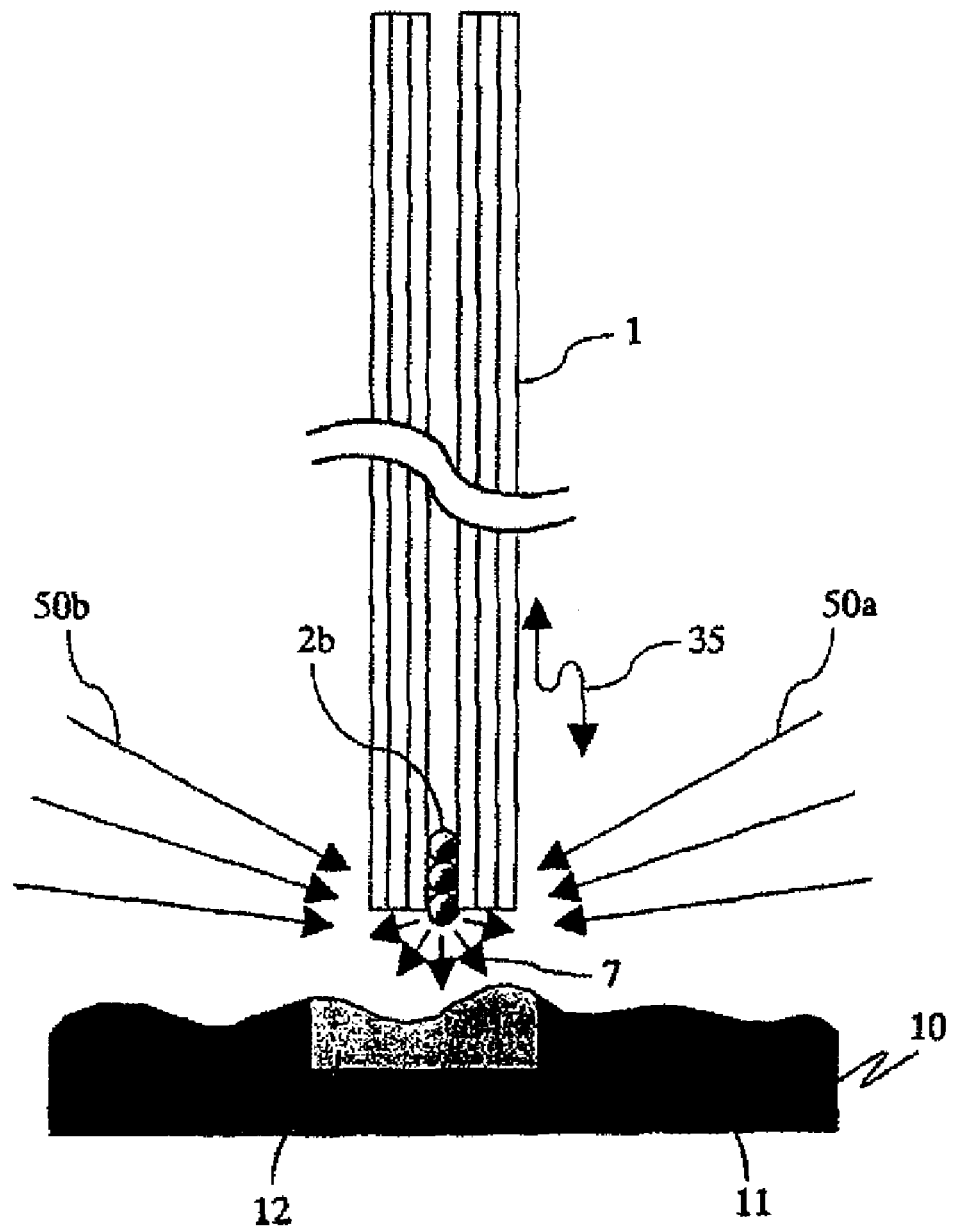
FIG. 6A is a cross sectional view of a front face of a probe in a modified embodiment of the plasmon enhanced near field probe in accordance with the embodiment 2.
Figure 6B:
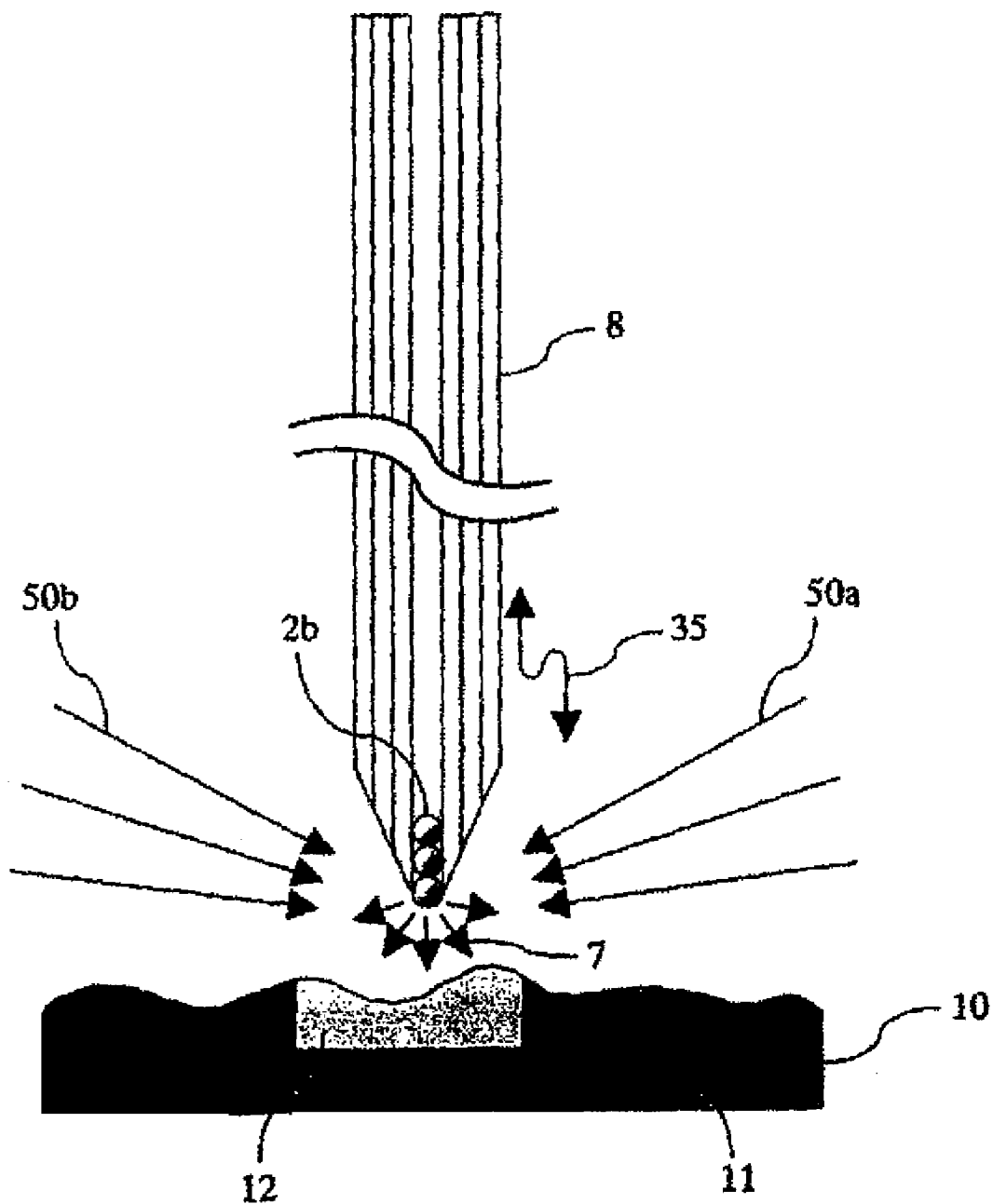
FIG. 6B is a cross sectional view of the front face of the probe in the modified embodiment of the plasmon enhanced near field probe in accordance with the embodiment 2.
Figure 7A:
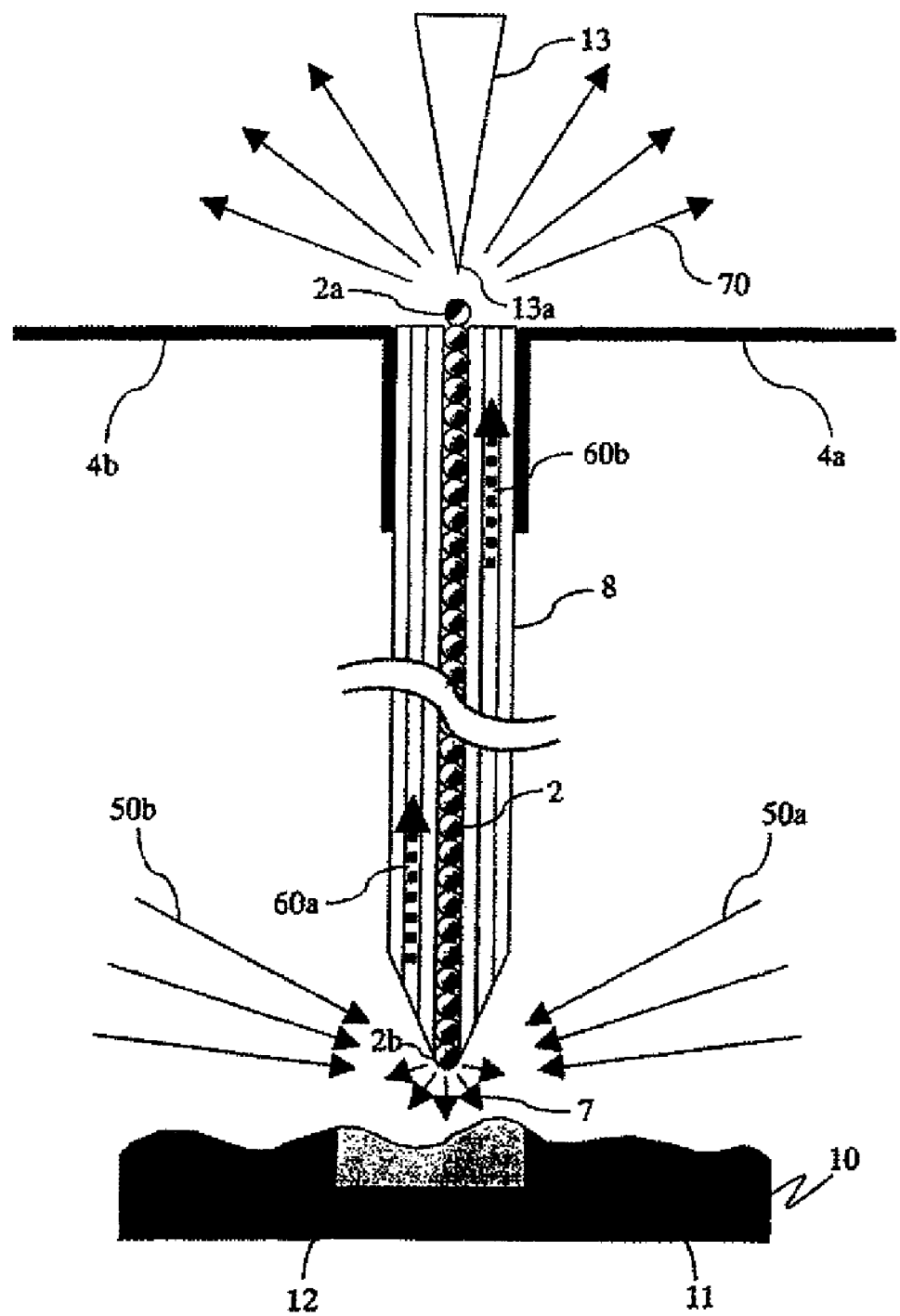
FIG. 7A is a cross sectional view of a front face of a plasmon enhanced near field probe in accordance with an embodiment 3.
Figure 7B:
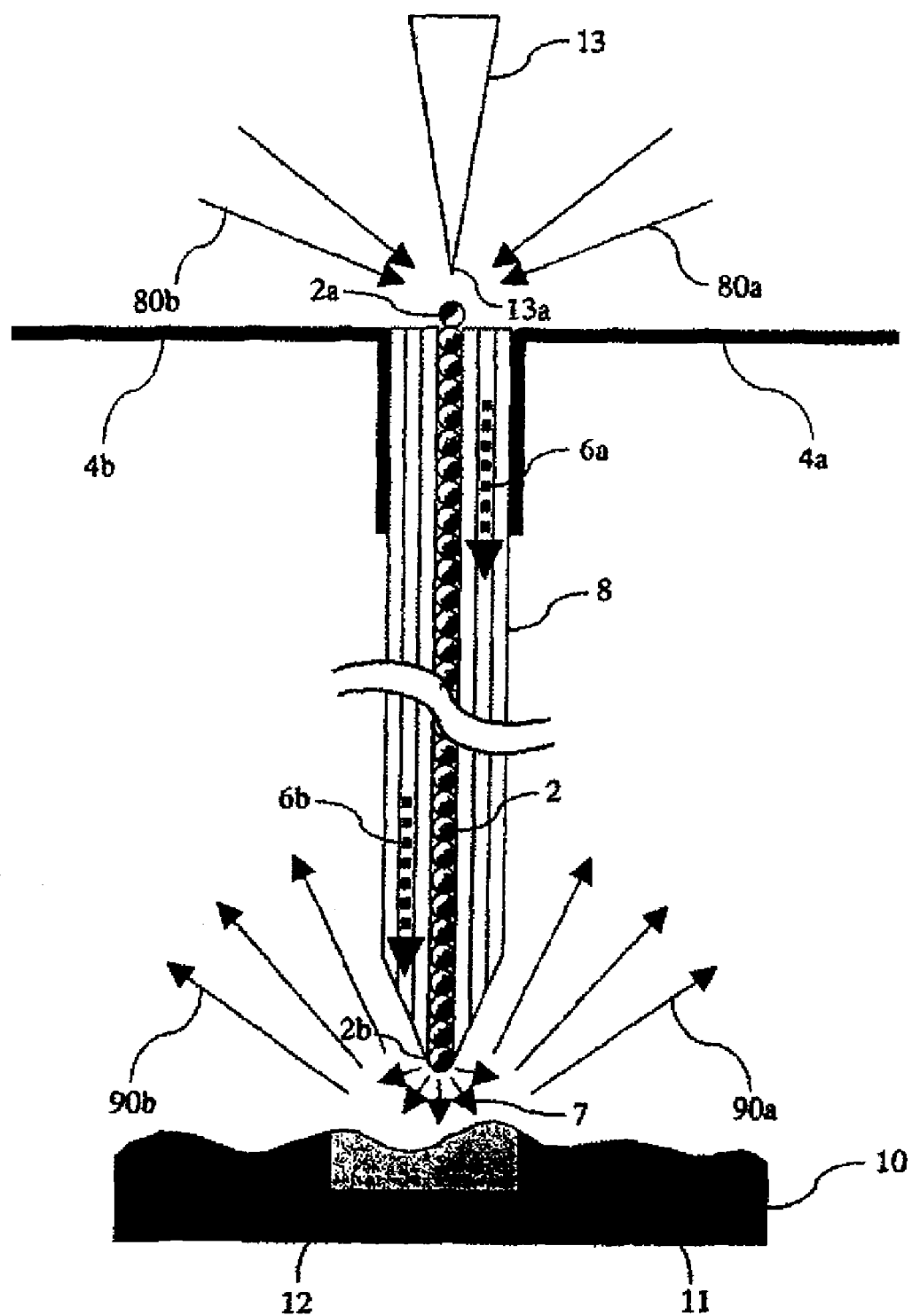
FIG. 7B is a cross sectional view of the front face of the plasmon enhanced near field probe in accordance with the embodiment 3.
Figure 8:
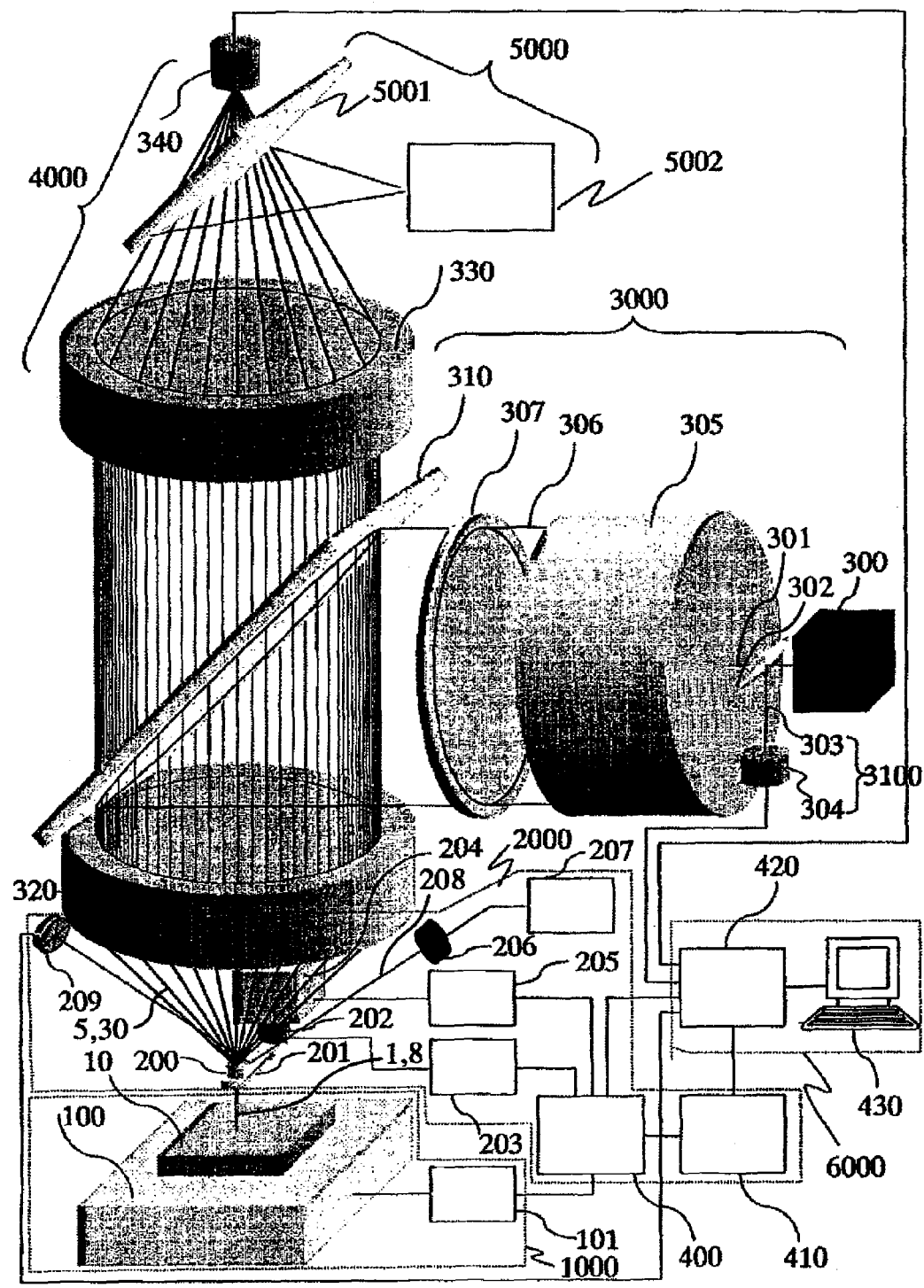
FIG. 8 is a block diagram showing a schematic structure of a scanning probe microscope in accordance with the embodiment 1.
Figure 9:
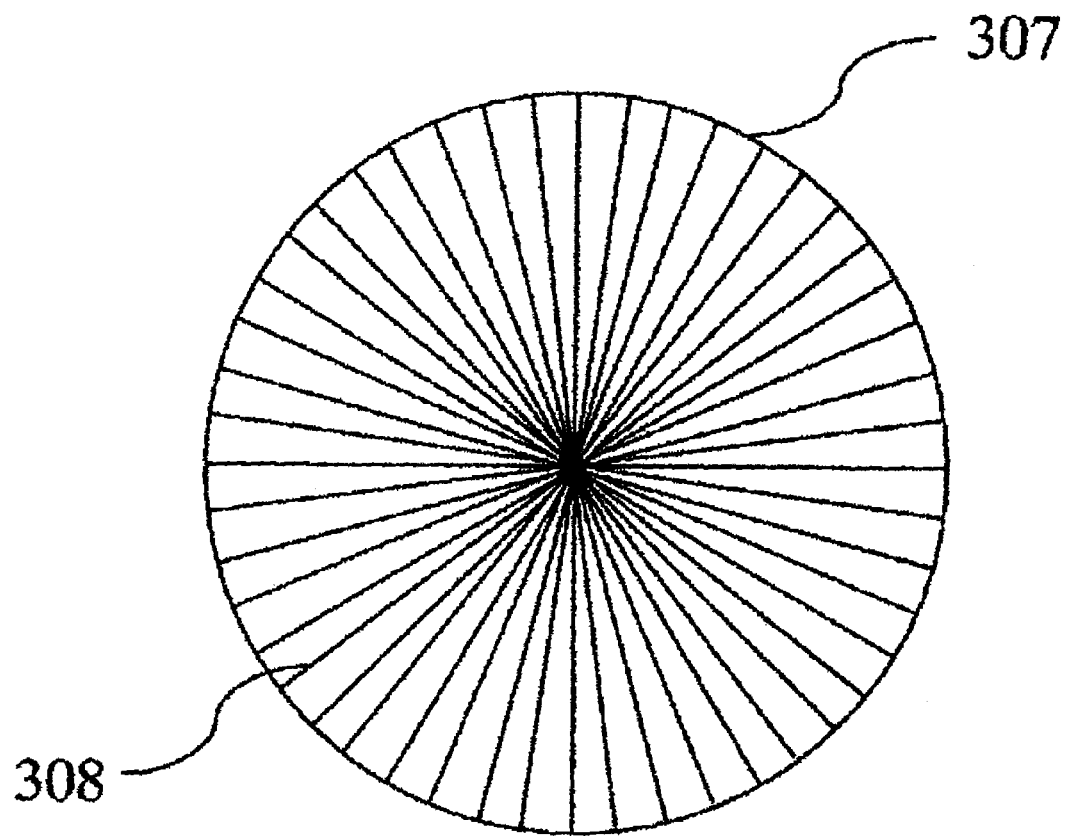
FIG. 9 is a schematic view showing a polarizing shaft of a polarizing plate.
Figure 10:
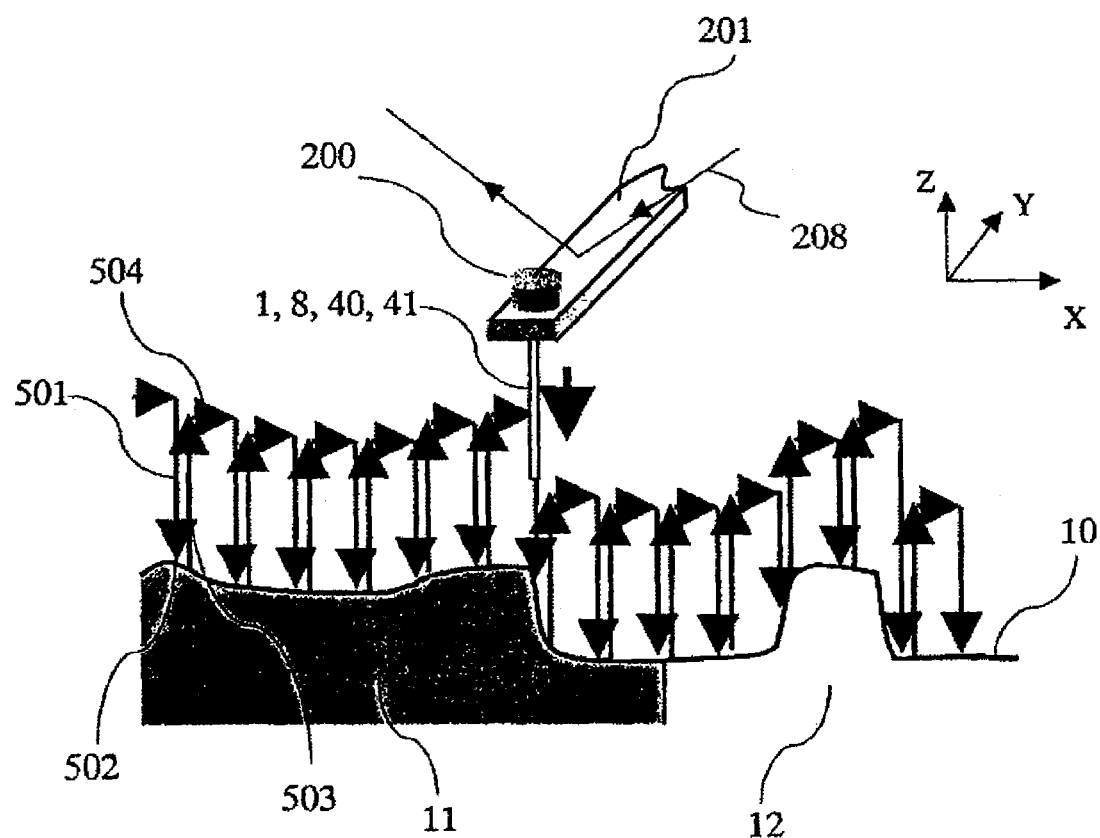
FIG. 10 is a perspective view of a sample cross section and a cantilever and shows a step-in scanning of a nanotube.
Figure 11A:
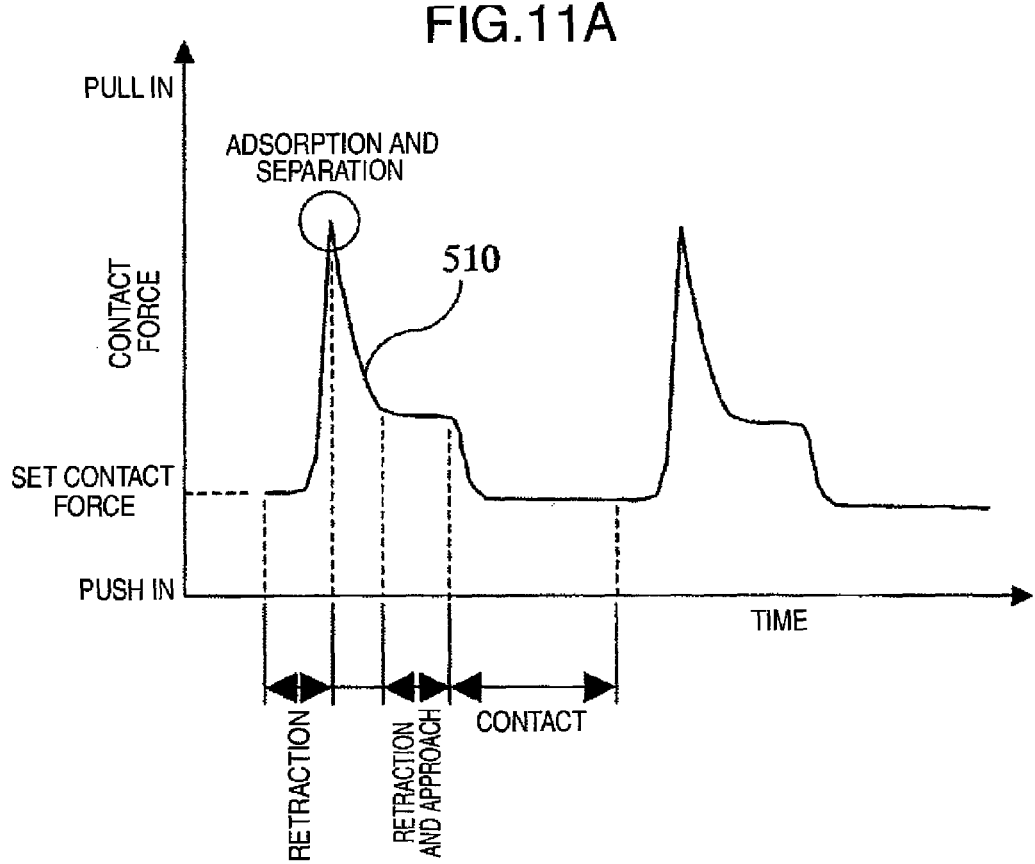
FIG. 11A is a graph showing a relation between a nanotube-sample contact force and a measuring timing of a near field light.
Figure 11B:
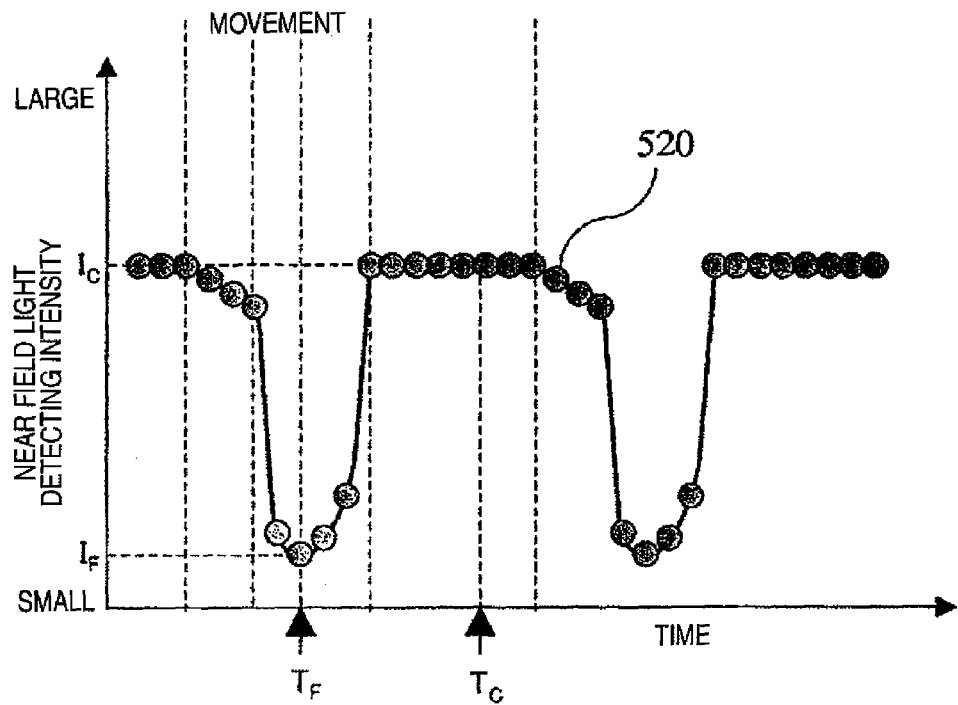
FIG. 11B is a graph showing the relation between the nanotube-sample contact force and the measuring timing of the near field light.
Figure 12:
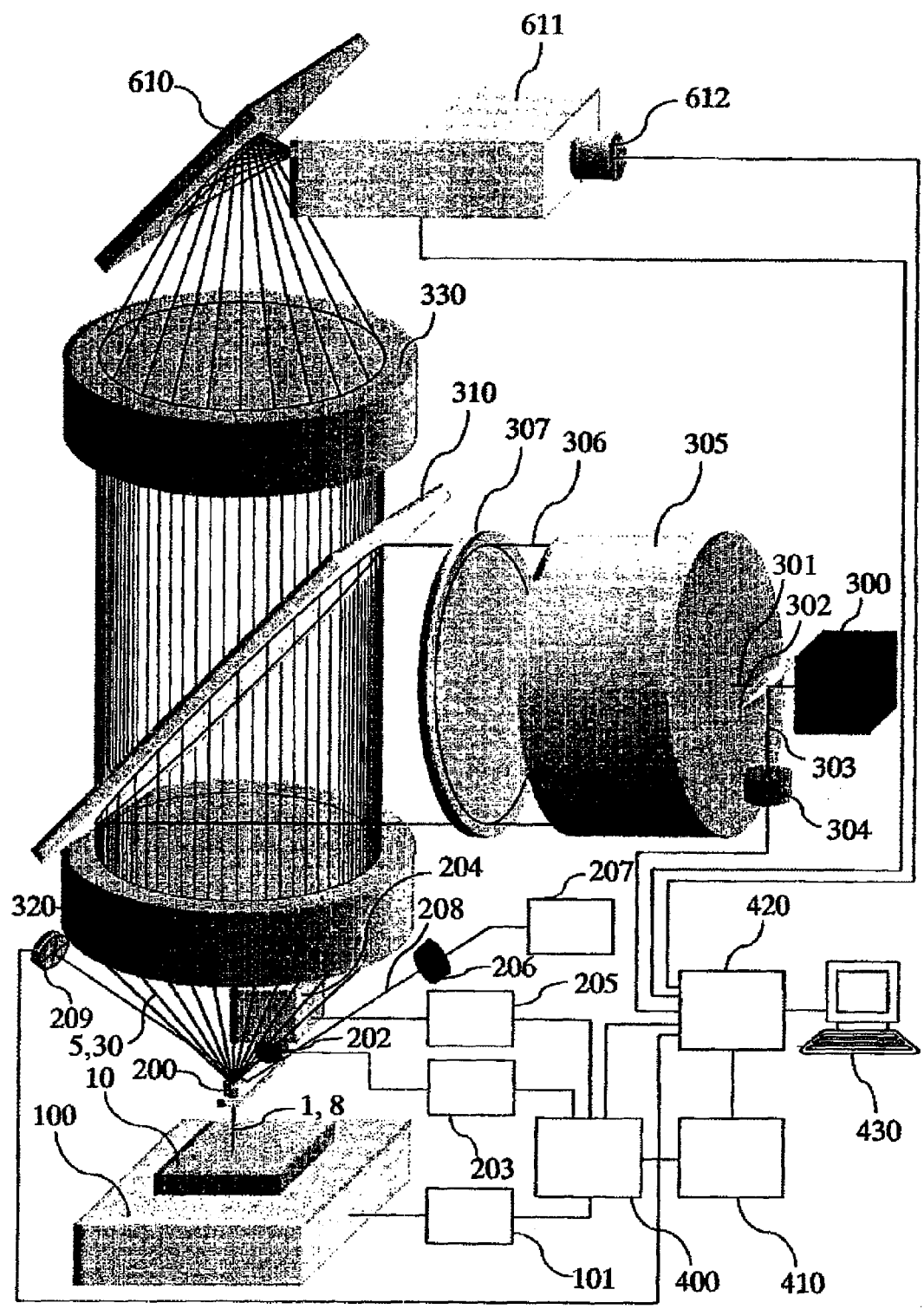
FIG. 12 is a block diagram showing a schematic structure of a scanning probe microscope in a modified embodiment 1 of a detecting optical system 4000 in accordance with the embodiment 1.
Figure 13A:
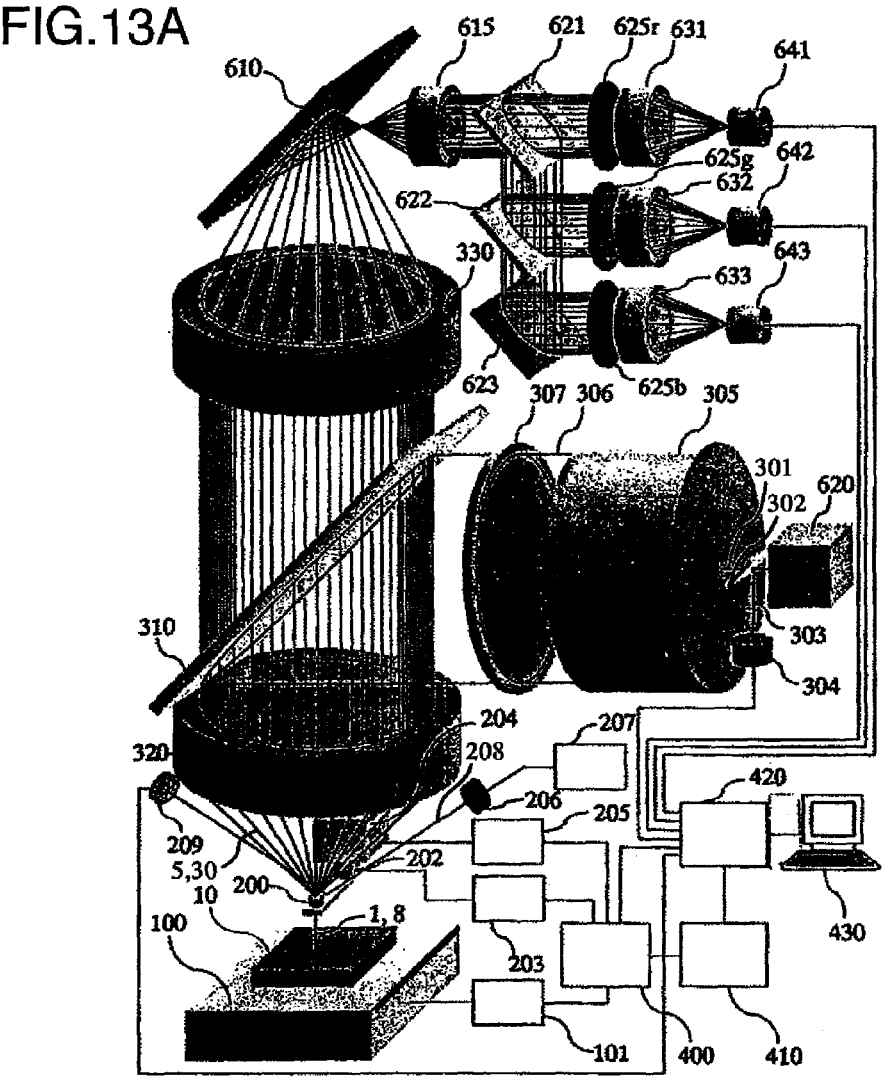
FIG. 13A is a block diagram showing a schematic structure of a scanning probe microscope in a modified embodiment 2 of the detecting optical system 4000 in accordance with the embodiment 1.
Figure 13B:
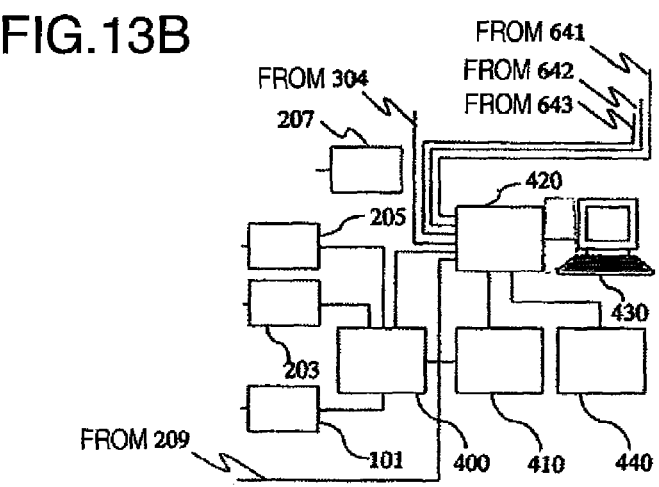
FIG. 13B is a block diagram showing the schematic structure of the scanning probe microscope in the modified embodiment 2 of the detecting optical system 4000 in accordance with the embodiment 1.
Figure 15:
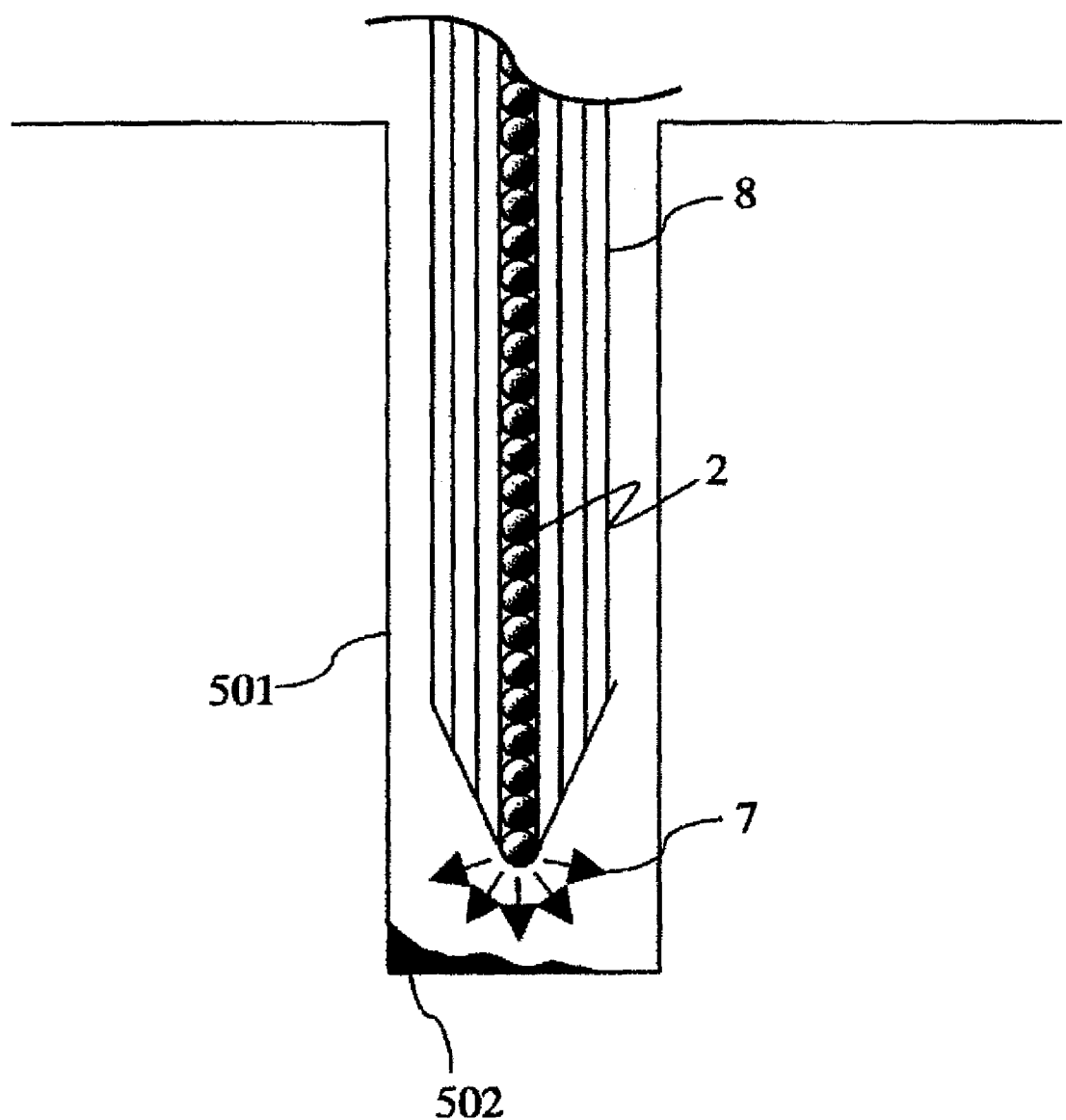
Figure 16:
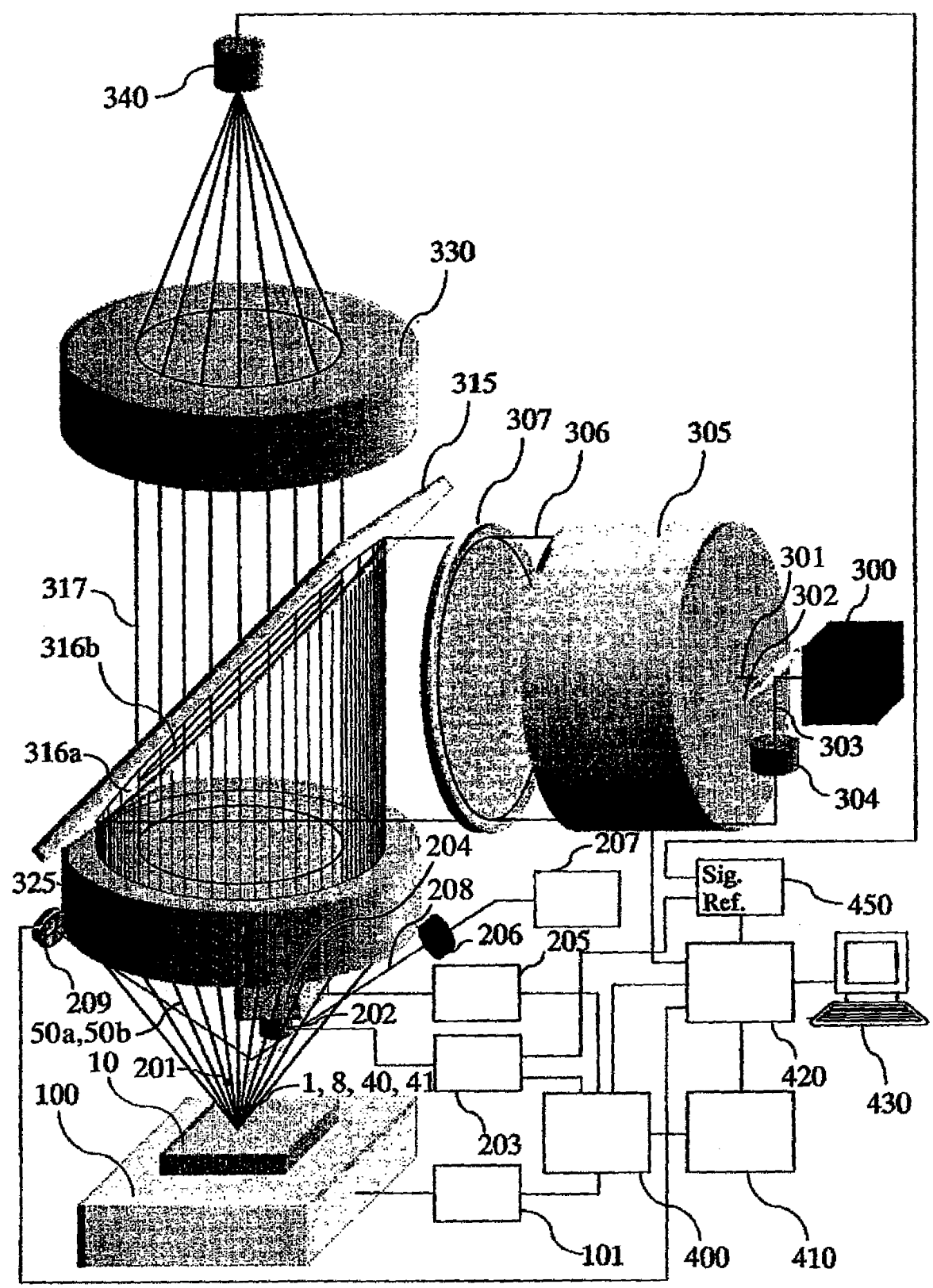
FIG. 16 is a block diagram showing a schematic structure of a scanning probe microscope in accordance with an embodiment 2.
Figure 17:
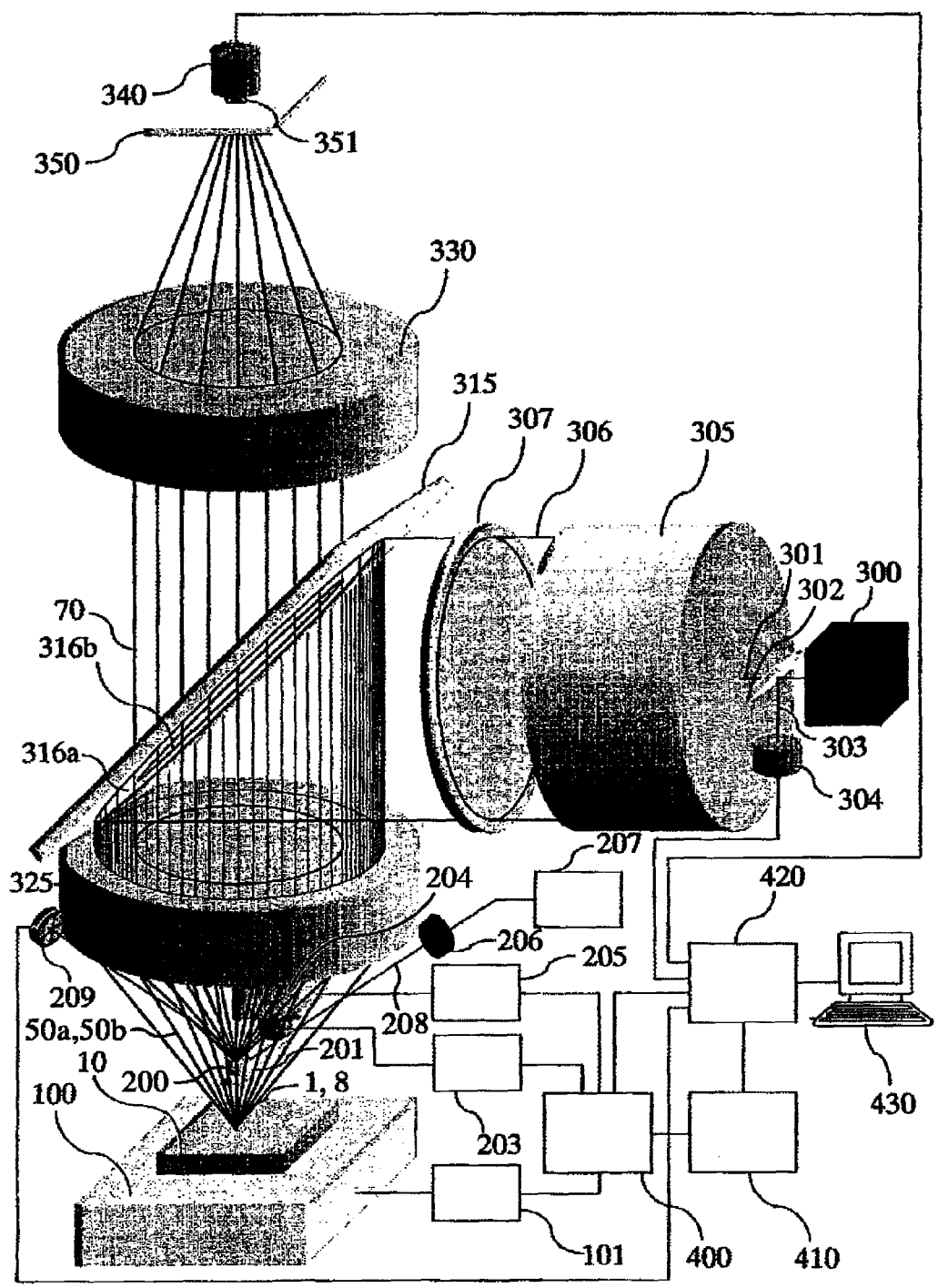
FIG. 17 is a block diagram showing a schematic structure of a scanning probe microscope in accordance with an embodiment 3.
Figure 18:
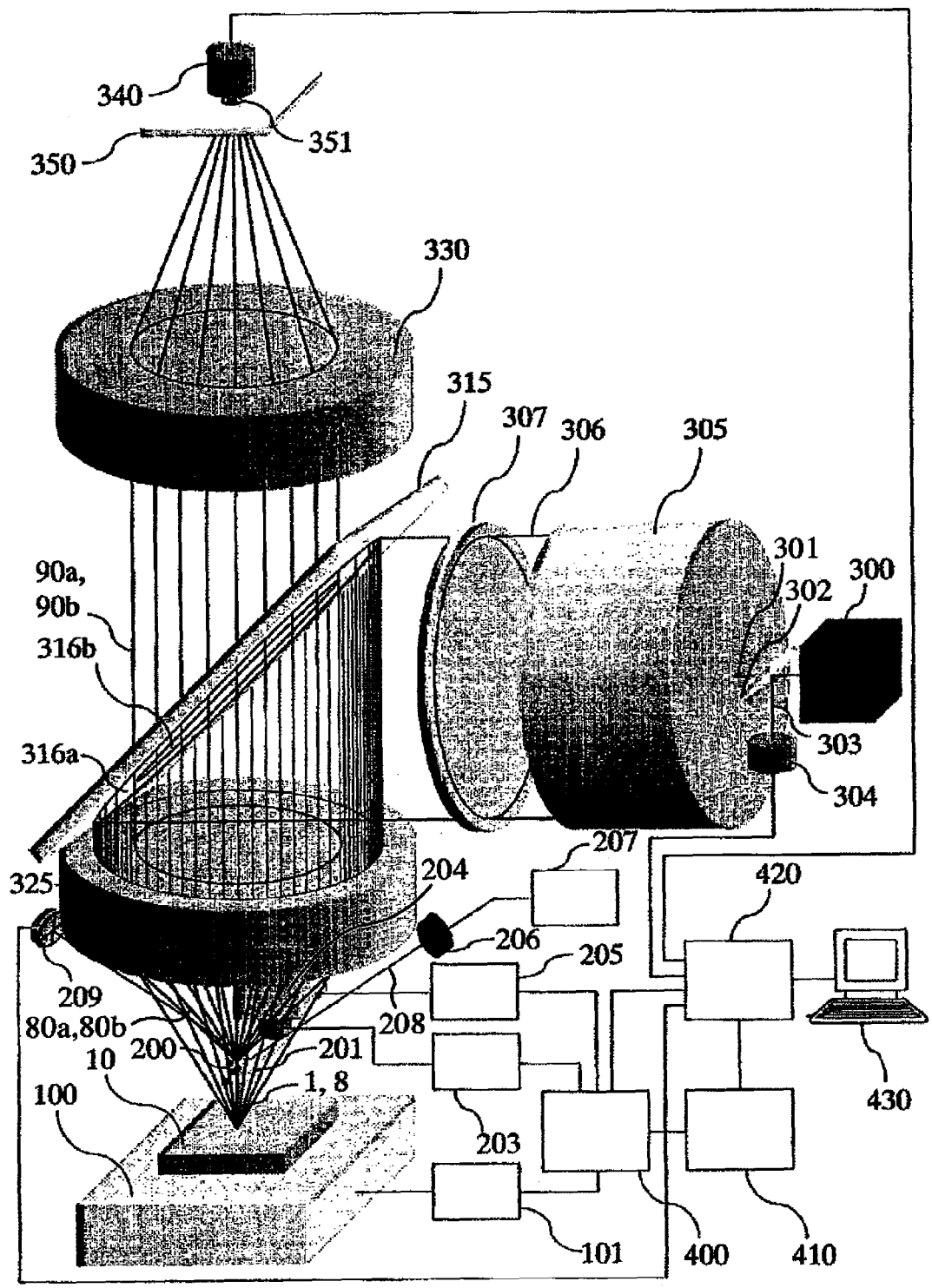
FIG. 18 is a block diagram showing a schematic structure of a scanning probe microscope in accordance with a modified embodiment of the embodiment 3.
Figure 19:
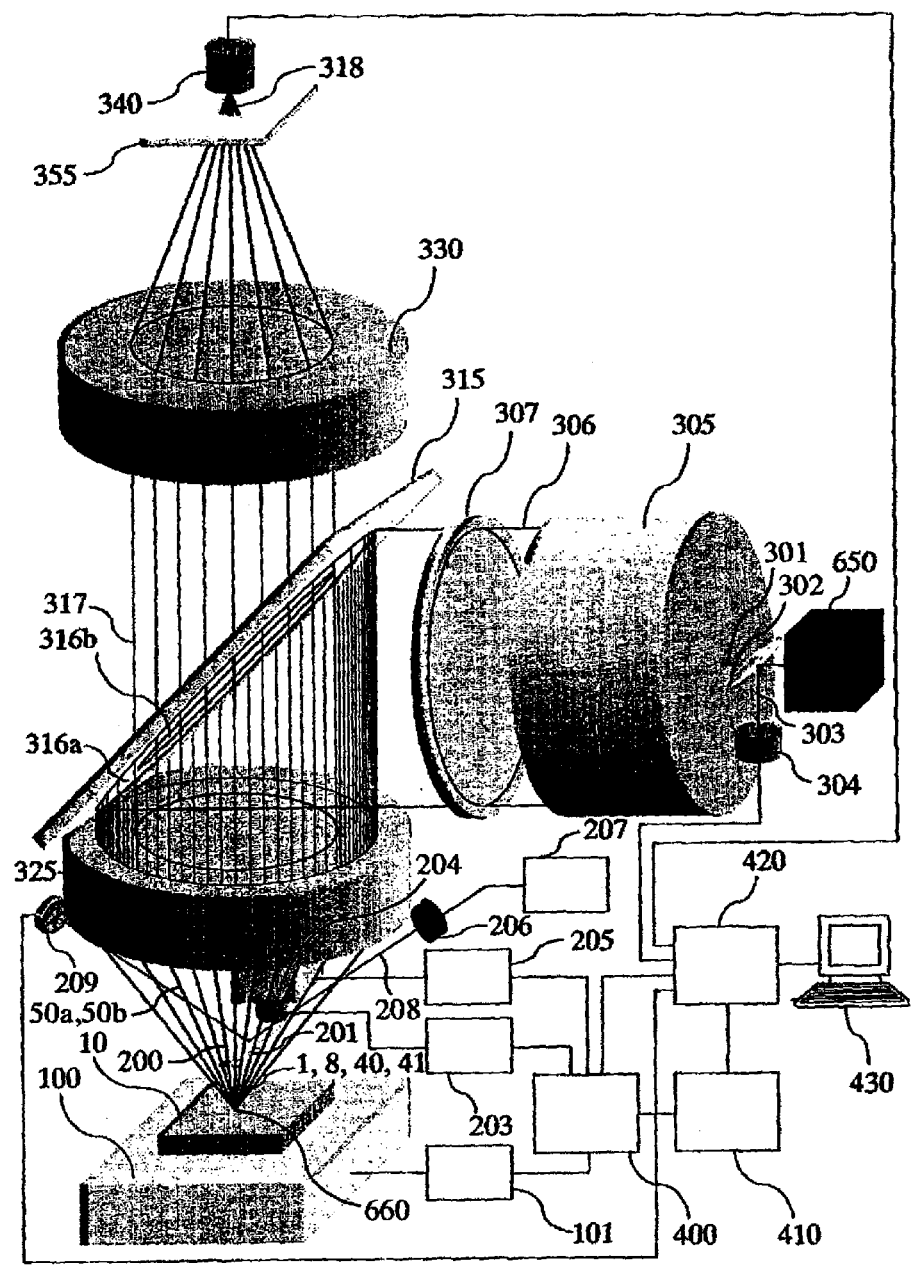
FIG. 19 is a block diagram showing a schematic structure of a scanning probe microscope in accordance with a modified embodiment of the embodiments 2 and 3.
Figure 21A:
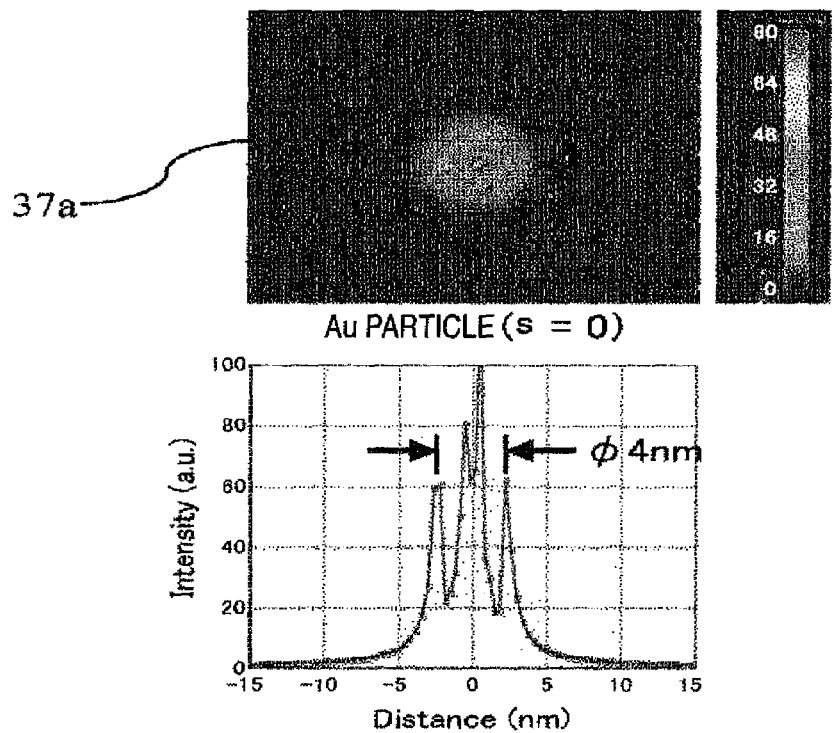
FIG. 21A shows a two-dimensional intensity distribution of a near field light and its cross sectional profile in a lower end portion of a plasmon enhanced near field probe in which a gold spherical nano particle is filled and a lower end portion is formed as a conical shape.
Figure 21B:
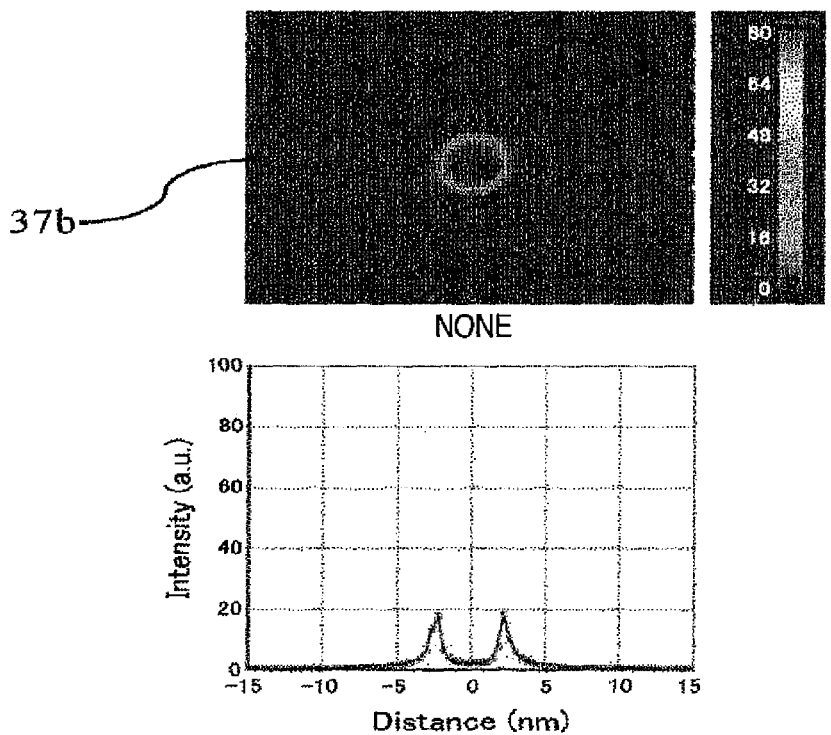
FIG. 21B shows a two-dimensional intensity distribution of a near field light and its cross sectional profile in a lower end portion of a plasmon enhanced near field probe in which a gold spherical nano particle is filled and a lower end portion is formed as a conical shape.
Figure 22A:
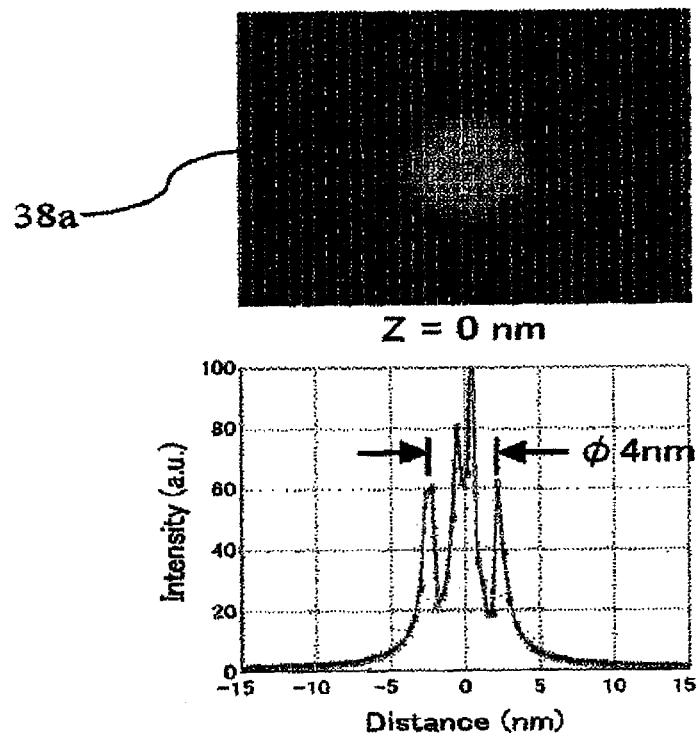
FIG. 22A shows a two-dimensional intensity distribution of a near field light and its cross sectional profile in a lower end portion of a plasmon enhanced near field probe in which a gold spherical nano particle is filled and a lower end portion is formed as a conical shape, and at positions which are 0.333 nm, 0.666 nm and 1 nm away from the lower end portion.
Figure 22B:
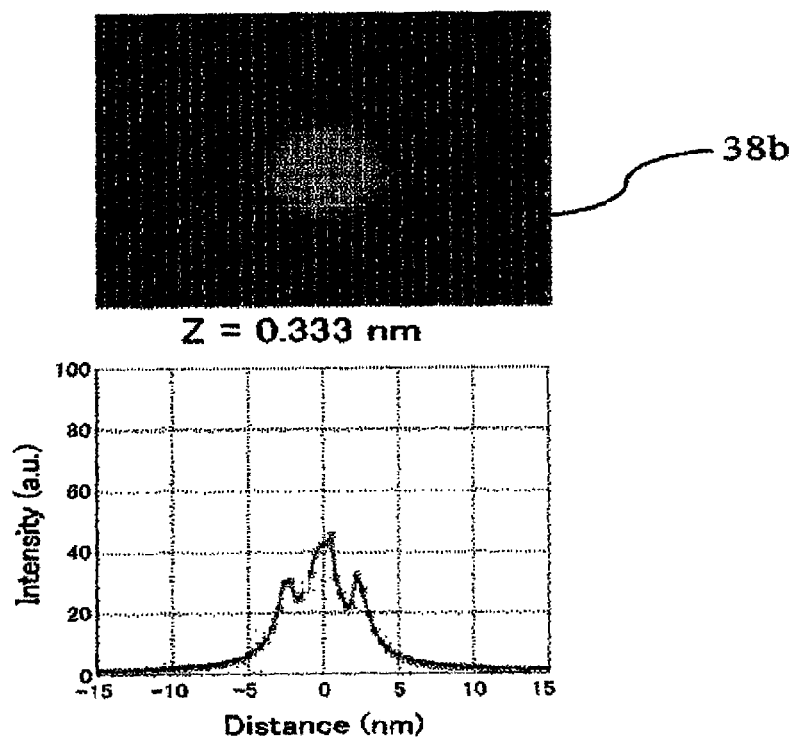
FIG. 22B shows a two-dimensional intensity distribution of a near field light and its cross sectional profile in a lower end portion of a plasmon enhanced near field probe in which a gold spherical nano particle is filled and a lower end portion is formed as a conical shape, and at positions which are 0.333 nm, 0.666 nm and 1 nm away from the lower end portion.
Figure 22C:
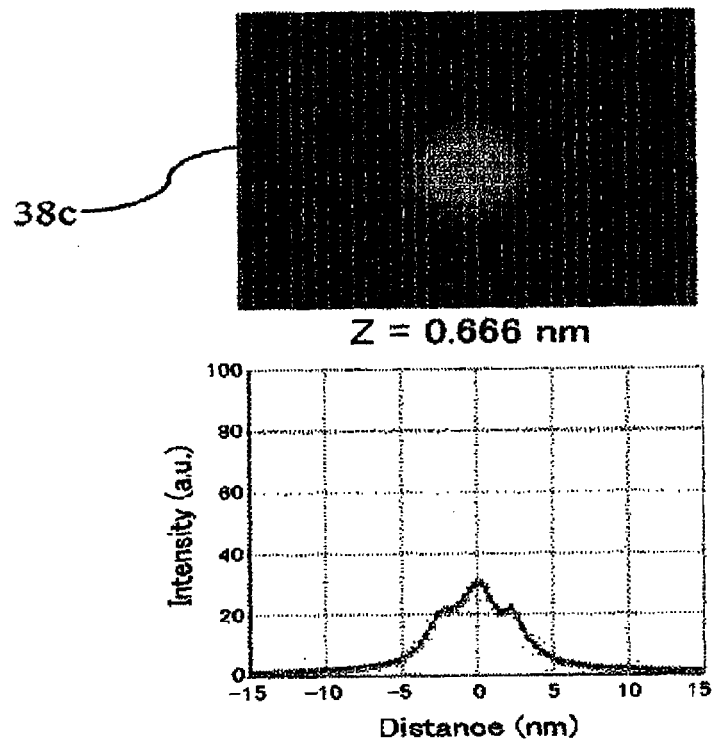
FIG. 22C shows a two-dimensional intensity distribution of a near field light and its cross sectional profile in a lower end portion of a plasmon enhanced near field probe in which a gold spherical nano particle is filled and a lower end portion is formed as a conical shape, and at positions which are 0.333 nm, 0.666 nm and 1 nm away from the lower end portion.
Figure 22D:
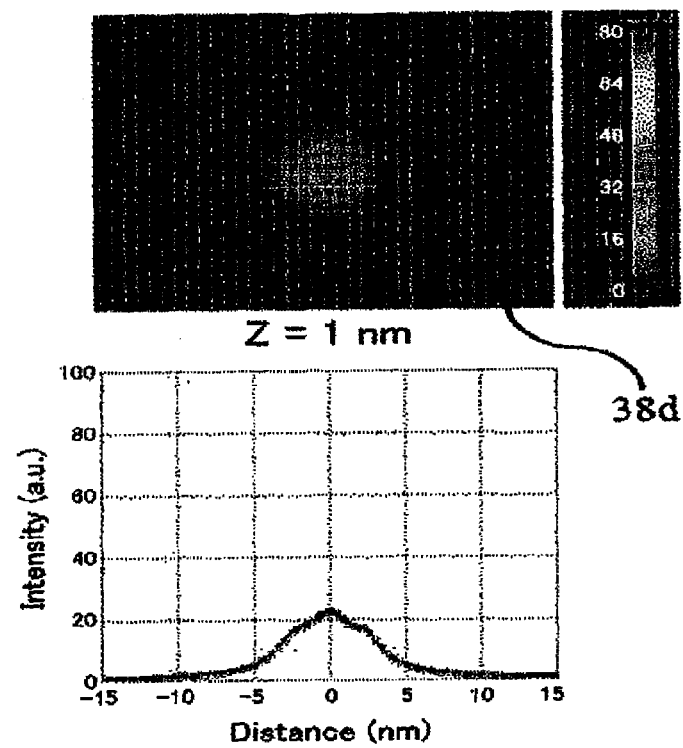
FIG. 22D shows a two-dimensional intensity distribution of a near field light and its cross sectional profile in a lower end portion of a plasmon enhanced near field probe in which a gold spherical nano particle is filled and a lower end portion is formed as a conical shape, and at positions which are 0.333 nm, 0.666 nm and 1 nm away from the lower end portion.
Figure 23:
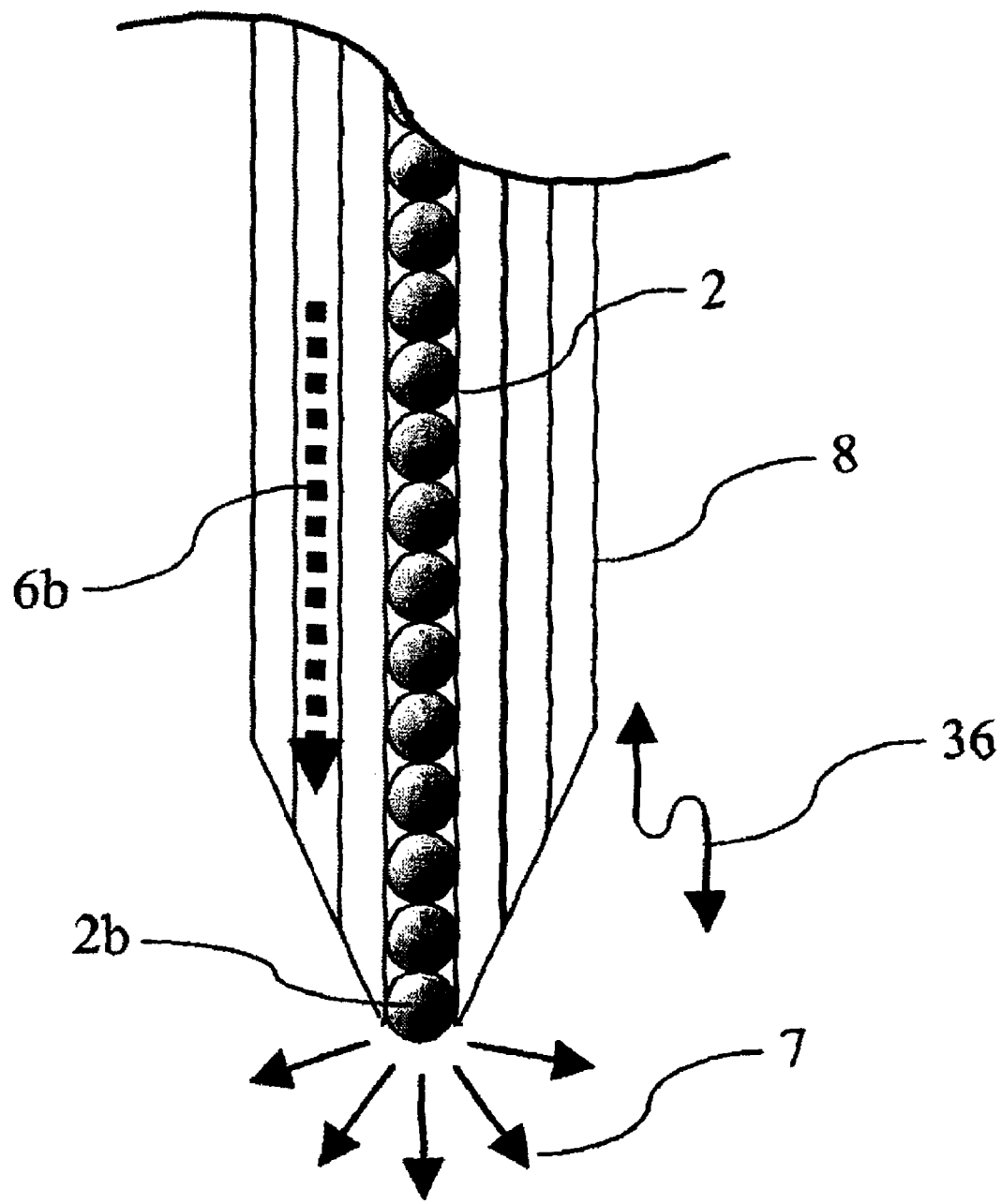
FIG. 23 is a cross sectional view of a front face of a probe and shows a state in which a nanotube in accordance with an embodiment 4 is finely oscillated in a longitudinal direction (a direction Z)
Figure 24:
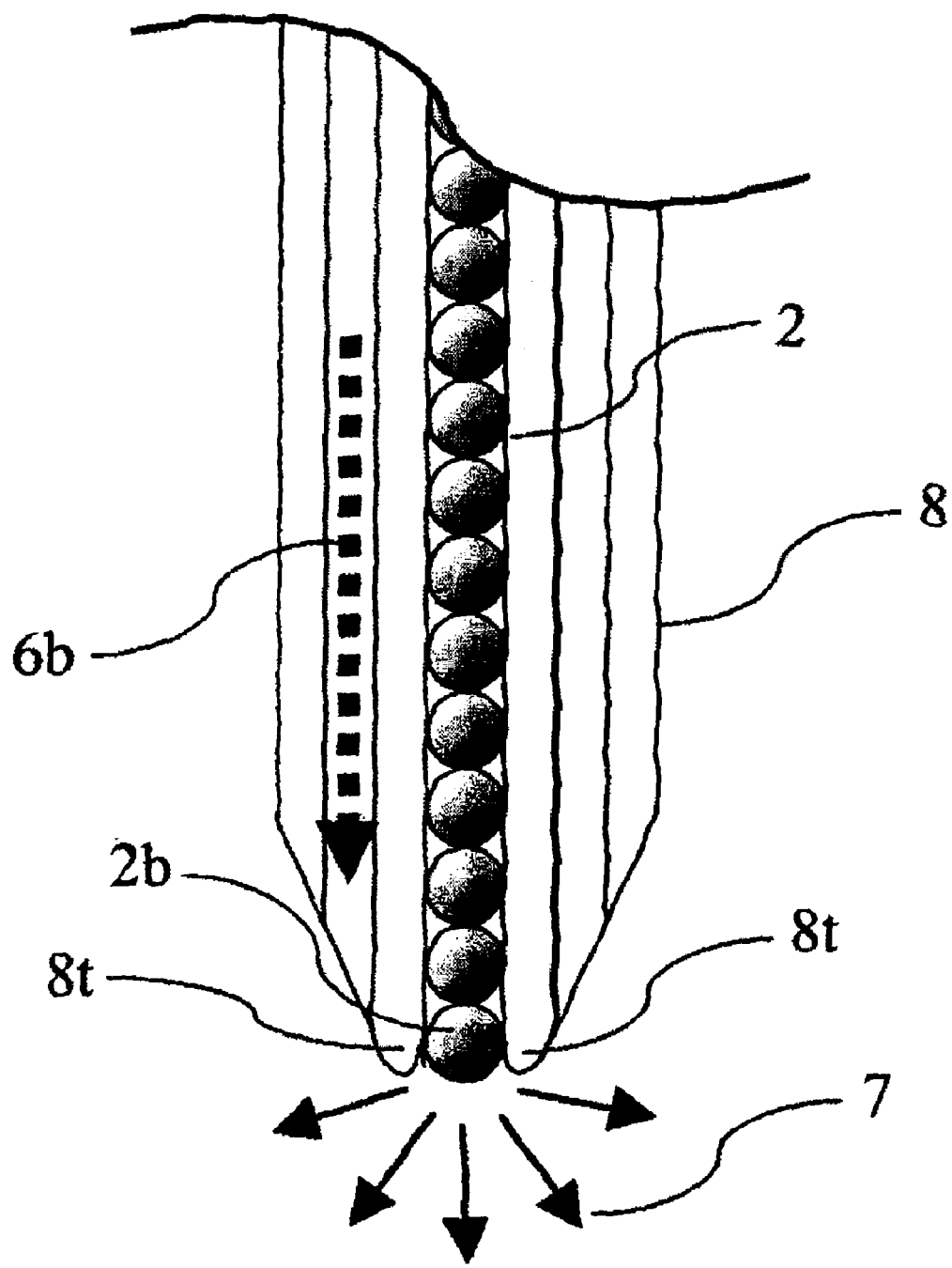
FIG. 24 is a cross sectional view of a front face of a plasmon enhanced near field probe in accordance with an embodiment 5.

DESCRIPTION OF REFERENCE NUMERALS 1, 8, 40, 41 . . . nanotube, 2, 2a, 2b . . . gold nano particle, 9 . . . gold nano rod, 10 . . . sample, 13 . . . gold wedge, 37a, 37b, 38a, 38b, 38c, 38d . . . two-dimensional intensity distribution of near field light, 100 . . . XYZ stage, 200 . . . coupling optical system, 201 . . . cantilever, 202 . . . piezoelectric element actuator, 204 . . . XYZ piezoelectric element actuator, 206, 300 . . . semiconductor laser, 207 . . . drive circuit, 209 . . . four-divided position sensor, 302, 310, 315 . . . beam splitter, 304, 340, 612, 641, 642, 643 . . . photoelectric conversion element, 305 . . . beam shaping optical system, 307 . . . polarizing plate, 320, 325 . . . objective lens, 330 . . . image forming lens, 350 . . . pinhole plate, 355 . . . interference filter, 400 scanning control unit, 410 . . . image forming unit, 420 . . . total control unit, 430 . . . output unit, 611 . . . spectroscope, 625r, 625g, 624b . . . color separation filter, 631, 632, 633 . . . focusing lens, 650 . . . Hd—Cd laser, 660 . . . fluorescent nano particle, 1000 stage portion, 2000 . . . measuring portion, 3000 . . . lighting optical system, 3100 . . . beam monitor optical system, 4000 . . . detecting optical system, 5000 . . . sample monitor optical system, 5001 . . . mirror, 5002 . . . imaging camera, 6000 . . . control portion

The invention claimed is:

1. A scanning probe microscope comprising:
   a measuring probe in which an inner portion is hollow and a metal particle or a metal rod is embedded in said hollow inner portion;
   a cantilever supporting said measuring probe;
   a cantilever driving means driving said cantilever so as to relatively and three-dimensionally scan said measuring probe with respect to a sample to be inspected;
   a displacement detecting optical system means detecting a deformation of said cantilever; and
   a near field optical image acquiring means acquiring a near field optical image on a surface of said sample to be inspected by generating a near field light between the measuring probe in which said metal particle or the metal rod is embedded and the surface of said sample to be inspected.

2. A scanning probe microscope as claimed in claim 1, further comprising an atomic force microscope (AFM) image forming means forming an atomic force microscope image (AFM image) of the surface of said sample to be inspected by processing a signal obtained by detecting the deformation of said cantilever by means of said displacement detecting optical system means.

3. A scanning probe microscope as claimed in claim 1, wherein said near field light image acquiring means comprises:
- a laser irradiating optical system irradiating a laser to one end of the measuring probe in which said metal particle or the metal rod is embedded;
- a near field light detecting optical system detecting a near field light generated between the other end or said one end of said measuring probe and the surface of said sample to be inspected by moving the other end or said one end of said measuring probe close to the surface of said sample to be inspected in a state in which the laser is irradiated by said laser irradiating optical system; and
- a near field light image processing system processing a signal obtained by detecting said near field light by said near field light detecting optical system so as to obtain a near field light image of said sample surface.

4. A scanning probe microscope as claimed in claim 3, wherein said laser irradiating optical system further comprises a polarization control portion controlling a state of a polarization of the laser irradiated to one end of the measuring probe in which said metal particle or the metal rod is embedded.

5. A scanning probe microscope as claimed in claim 3, wherein said laser irradiating optical system irradiates a white laser to one end of the measuring probe in which said metal particle or the metal rod is embedded, said near field light detecting optical system detects a near field light generated between the other end or said one end of said measuring probe and the surface of said sample to be inspected by separating a wavelength, and obtains a color near field light image of said sample surface by processing and combining the signals detected by separating the wavelength in said near field light image processing system.

6. A scanning probe microscope as claimed in claim 1, wherein said measuring probe is formed by a carbon nanotube or a boron nitride nanotube, and a gold particle, a gold rod, a silver particle or a silver rod is embedded in an inner portion of said carbon nanotube or the boron nitride nanotube.

7. An observing method of a sample by using a scanning probe microscope, comprising the steps of:
- driving a cantilever supporting a measuring probe in which an inner portion is hollow and a metal particle or a metal rod is embedded in the hollow inner portion so as to relatively and three-dimensionally scan said measuring probe with respect to a sample to be inspected;
- optically detecting the deformation of said cantilever on the basis of said three-dimensional scanning; and
- acquiring a near field optical image of the surface of said sample to be inspected by using the measuring probe in which said metal particle or the metal rod is embedded.

8. An observing method of a sample by using a scanning probe microscope as claimed in claim 7, wherein the method forms an atomic force microscope image (AFM image) of the surface of said sample to be inspected by processing a signal obtained by optically detecting the deformation of said cantilever.

9. An observing method of a sample by using a scanning probe microscope as claimed in claim 7, wherein said near field light image of said sample surface is obtained by irradiating a laser to one end of the measuring probe in which said metal particle or the metal rod is embedded, detecting the near field light generated between the other end or said one end of said measuring probe and the surface of said sample to be inspected by moving the other end or said one end of said measuring probe close to the surface of said sample to be inspected in a state in which said laser is irradiated, and processing the signal obtained by detecting said near field light.

10. An observing method of a sample by using a scanning probe microscope as claimed in claim 9, wherein the laser irradiated to one end of the measuring probe in which said metal particle or the metal rod is embedded is constructed by a laser in which a state of a polarization is controlled.

11. An observing method of a sample by using a scanning probe microscope as claimed in claim 7, wherein said near field light is detected by using a carbon nanotube or a boron nitride nanotube in which a gold particle, a gold rod, a silver particle or a silver rod is embedded in an inner portion, as said measuring probe.

12. An observing method of a sample by using a scanning probe microscope as claimed in claim 7, wherein the laser irradiated to one end of the measuring probe in which said metal particle or the metal rod is embedded is constructed by a white laser, and a color near field light image of the surface of said sample to be inspected is obtained by detecting a near field light generated between the other end or said one end of said measuring probe and the surface of said sample to be inspected by separating a wavelength, and processing the signals obtained by detecting by separating the wavelength.

* * * * *